US011878738B2

(12) United States Patent
Richardson

(10) Patent No.: US 11,878,738 B2
(45) Date of Patent: Jan. 23, 2024

(54) REINFORCEMENT DEVICES

(71) Applicant: Zephyros, Inc., Romeo, MI (US)

(72) Inventor: Henry Richardson, Romeo, MI (US)

(73) Assignee: Zephyros, Inc., Romeo, MI (US)

( * ) Notice: Subject to any disclaimer, the term of this patent is extended or adjusted under 35 U.S.C. 154(b) by 120 days.

(21) Appl. No.: 17/609,086

(22) PCT Filed: Jun. 5, 2020

(86) PCT No.: PCT/US2020/036385
§ 371 (c)(1),
(2) Date: Nov. 5, 2021

(87) PCT Pub. No.: WO2020/247794
PCT Pub. Date: Dec. 10, 2020

(65) Prior Publication Data
US 2022/0204095 A1 Jun. 30, 2022

Related U.S. Application Data

(60) Provisional application No. 62/858,628, filed on Jun. 7, 2019.

(51) Int. Cl.
*B62D 29/00* (2006.01)
*B62D 25/00* (2006.01)
(Continued)

(52) U.S. Cl.
CPC .......... *B62D 29/002* (2013.01); *B62D 25/00* (2013.01); *B62D 25/025* (2013.01); *B62D 25/04* (2013.01); *B62D 29/00* (2013.01); *B62D 29/005* (2013.01)

(58) Field of Classification Search
CPC .... B62D 29/00; B62D 29/001; B62D 29/002; B62D 29/005; B62D 25/00; B60R 13/0815; C09J 201/00
(Continued)

(56) References Cited

U.S. PATENT DOCUMENTS 6,607,238 B2  8/2003 Barz
7,063,376 B2 * 6/2006 Ori ................ B62D 29/007
296/29
(Continued)

FOREIGN PATENT DOCUMENTS

WO  2004/101349 A2  11/2004
WO  WO-2005002950 A2 *  1/2005  ............. B21D 53/88
(Continued)

OTHER PUBLICATIONS

PCT International Search Report & Written Opinion dated Sep. 16, 2020, Application No. PCT/US2020/036385.

*Primary Examiner* — Amy R Weisberg
*Assistant Examiner* — Joyce Eileen Hill
(74) *Attorney, Agent, or Firm* — The Dobrusin Law Firm, PC

(57) ABSTRACT

The present teachings provide a reinforcement for a cavity. The reinforcement may include a carrier having a length extending along an axis between a first end and a second end. The carrier may include one or more longitudinal structures and one or more transverse structures. The carrier may also include one or more walls joined together to form one or more cavities extending along the axis. The carrier may have a cross-sectional shape roughly corresponding to the cross-sectional shape of interior of a hollow structural member. The device may also include a secondary material placed over the carrier. The secondary material is configured to expand, seal, reinforce, or a combination thereof upon application of a selectable stimuli and adhere to the interior of the cavity to provide reinforcement of the same.

20 Claims, 21 Drawing Sheets

(51) Int. Cl.
*B62D 25/04* (2006.01)
*B62D 25/02* (2006.01)

(58) Field of Classification Search
USPC ............. 296/187.02, 187.03, 187.06, 193.06
See application file for complete search history.

(56) References Cited

U.S. PATENT DOCUMENTS

| | | |
|---|---|---|
| 7,313,865 B2 | 1/2008 | Czaplicki |
| 7,503,620 B2 | 3/2009 | Brennecke et al. |
| 2005/0230027 A1* | 10/2005 | Kassa .................... C08G 18/10 156/331.4 |
| 2009/0085379 A1* | 4/2009 | Takahashi .............. B62D 25/04 296/193.06 |
| 2015/0284034 A1* | 10/2015 | Blank ................... B29C 66/742 428/188 |
| 2017/0072887 A1* | 3/2017 | Richardson .......... B62D 29/048 |
| 2018/0022397 A1* | 1/2018 | Richardson ............ B62D 21/15 296/187.03 |
| 2019/0144050 A1 | 5/2019 | Belpaire |

FOREIGN PATENT DOCUMENTS

| | | |
|---|---|---|
| WO | 2015/179383 A1 | 11/2015 |
| WO | 2016/145158 A1 | 9/2016 |
| WO | 2018/017978 A1 | 1/2018 |

\* cited by examiner

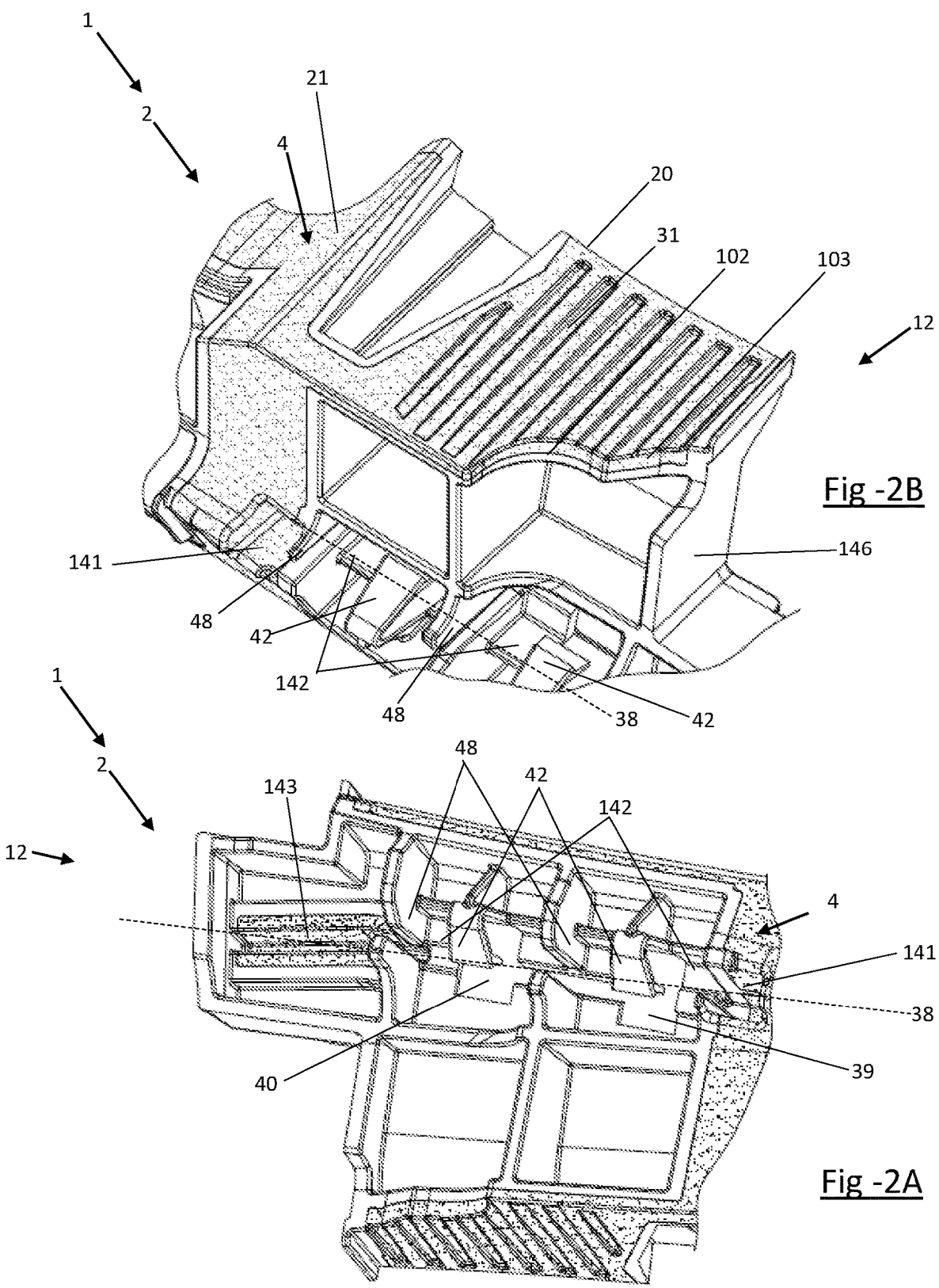

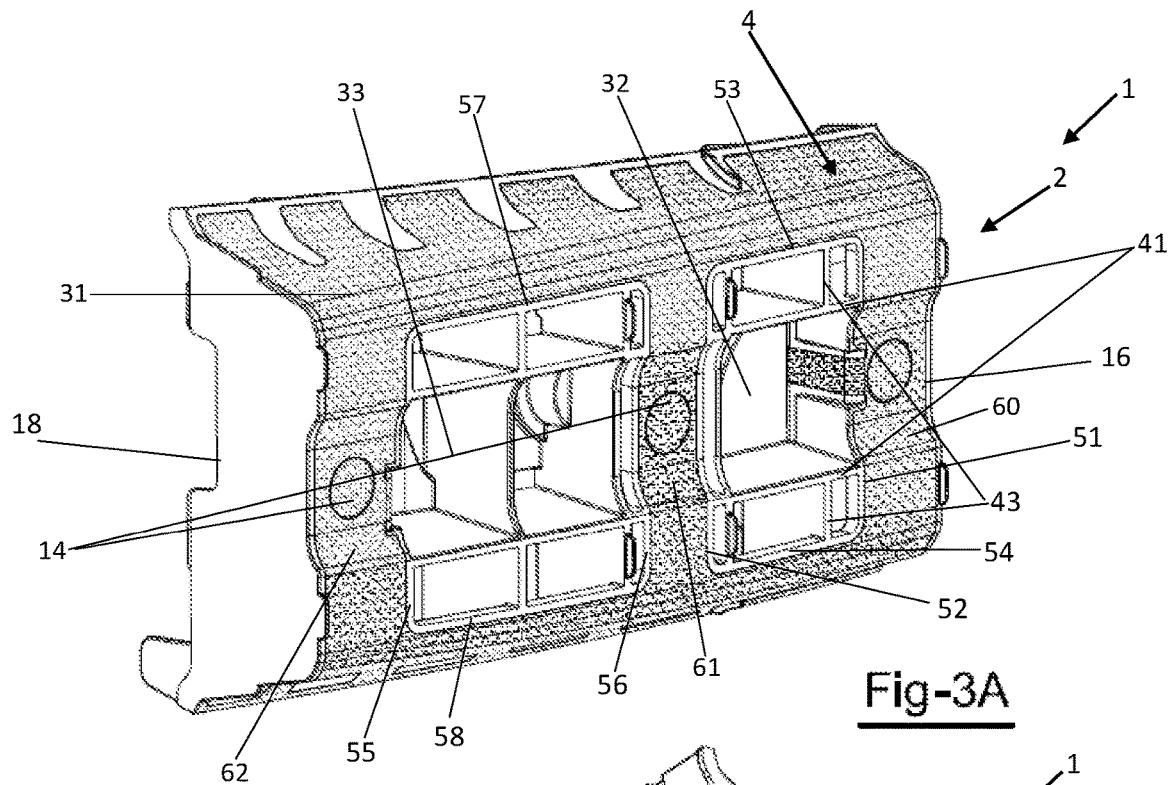
Fig-3A
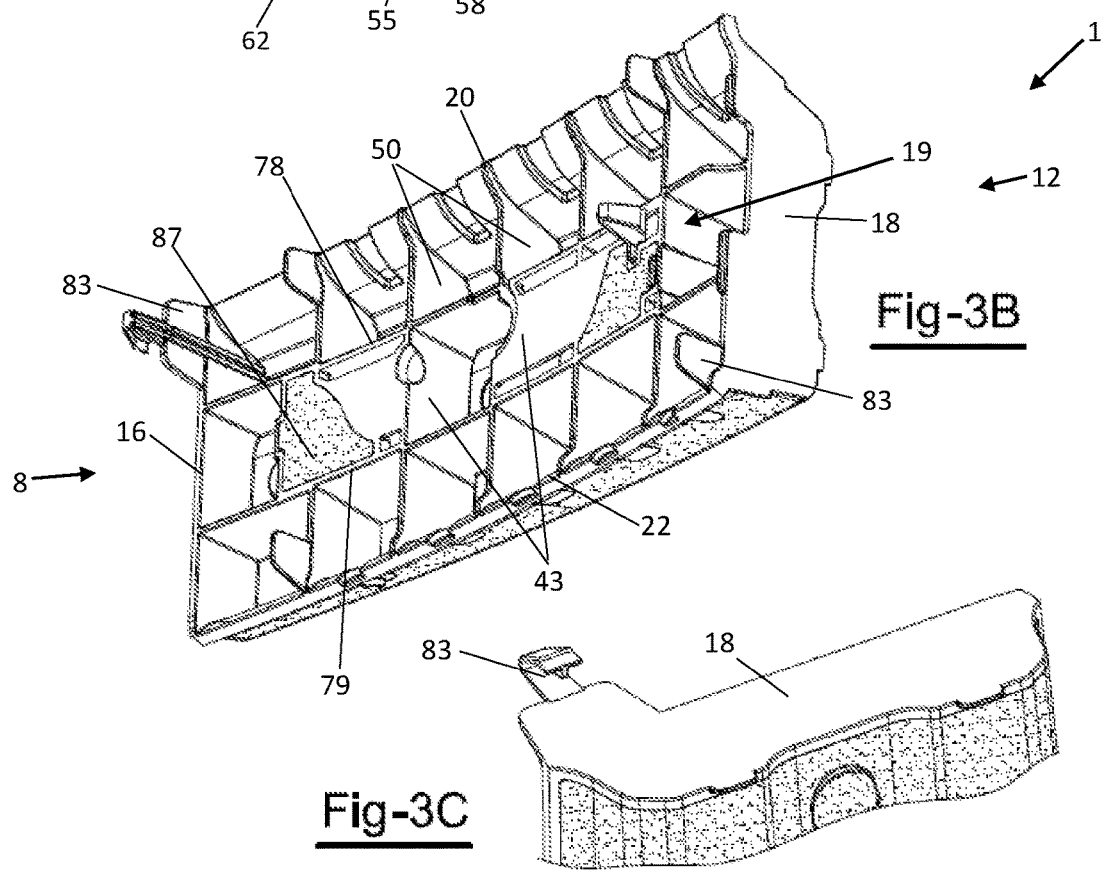
Fig-3B
Fig-3C

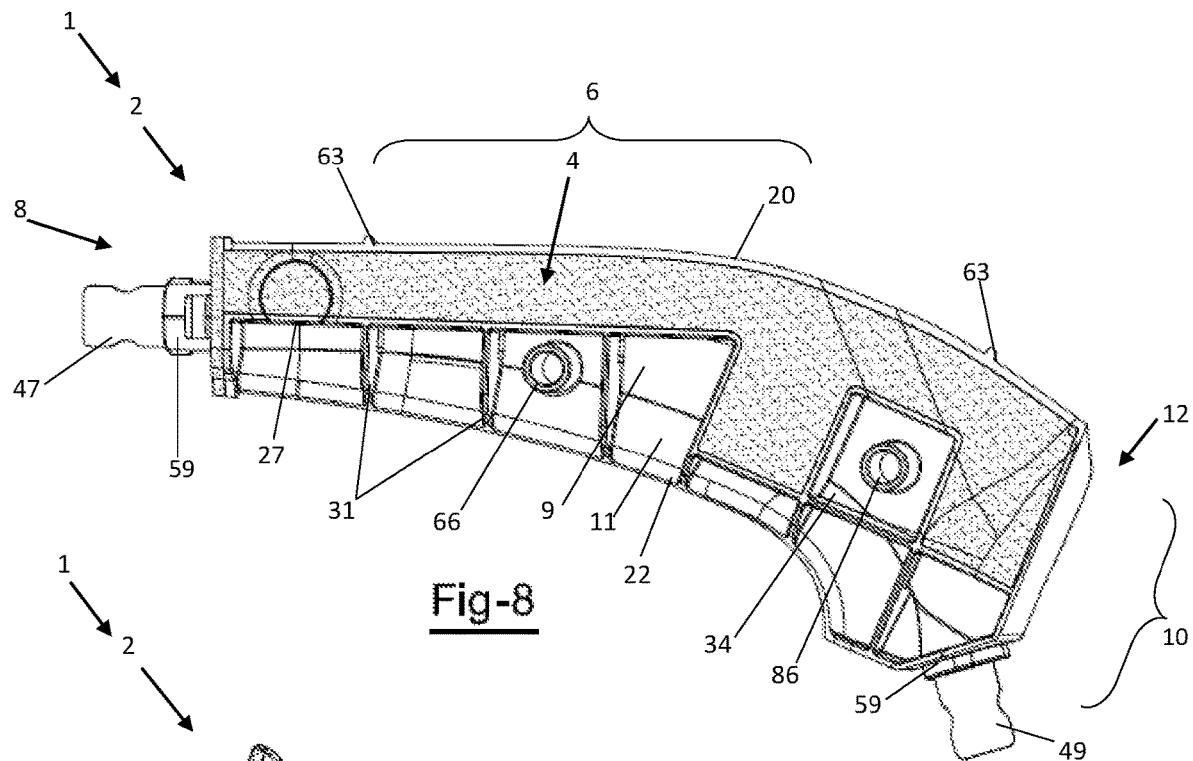
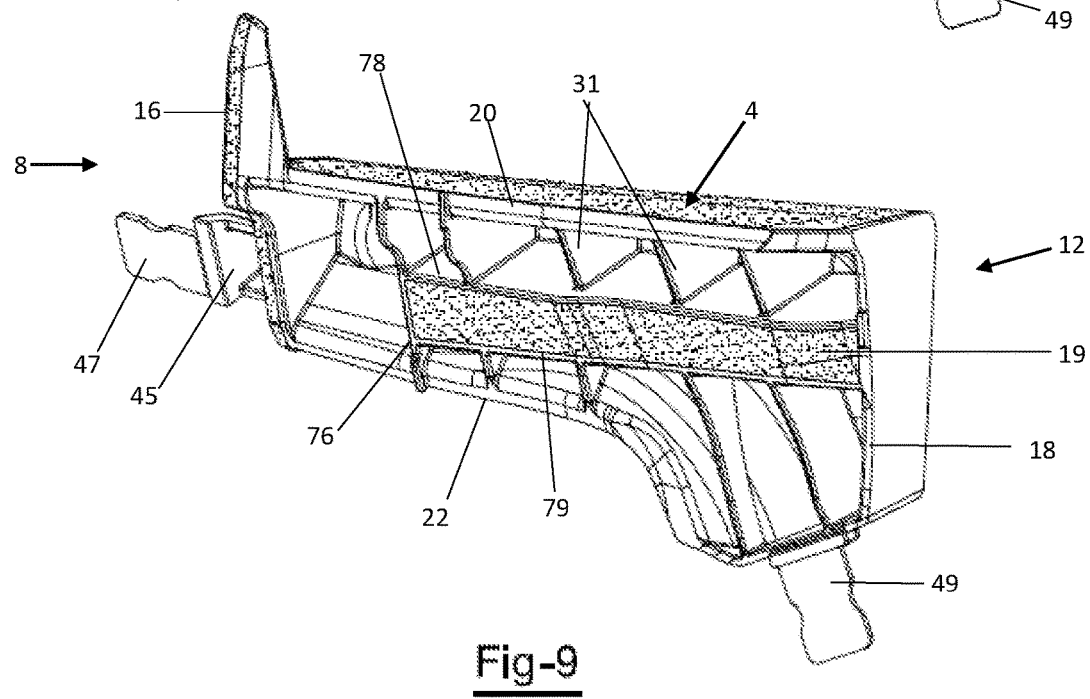

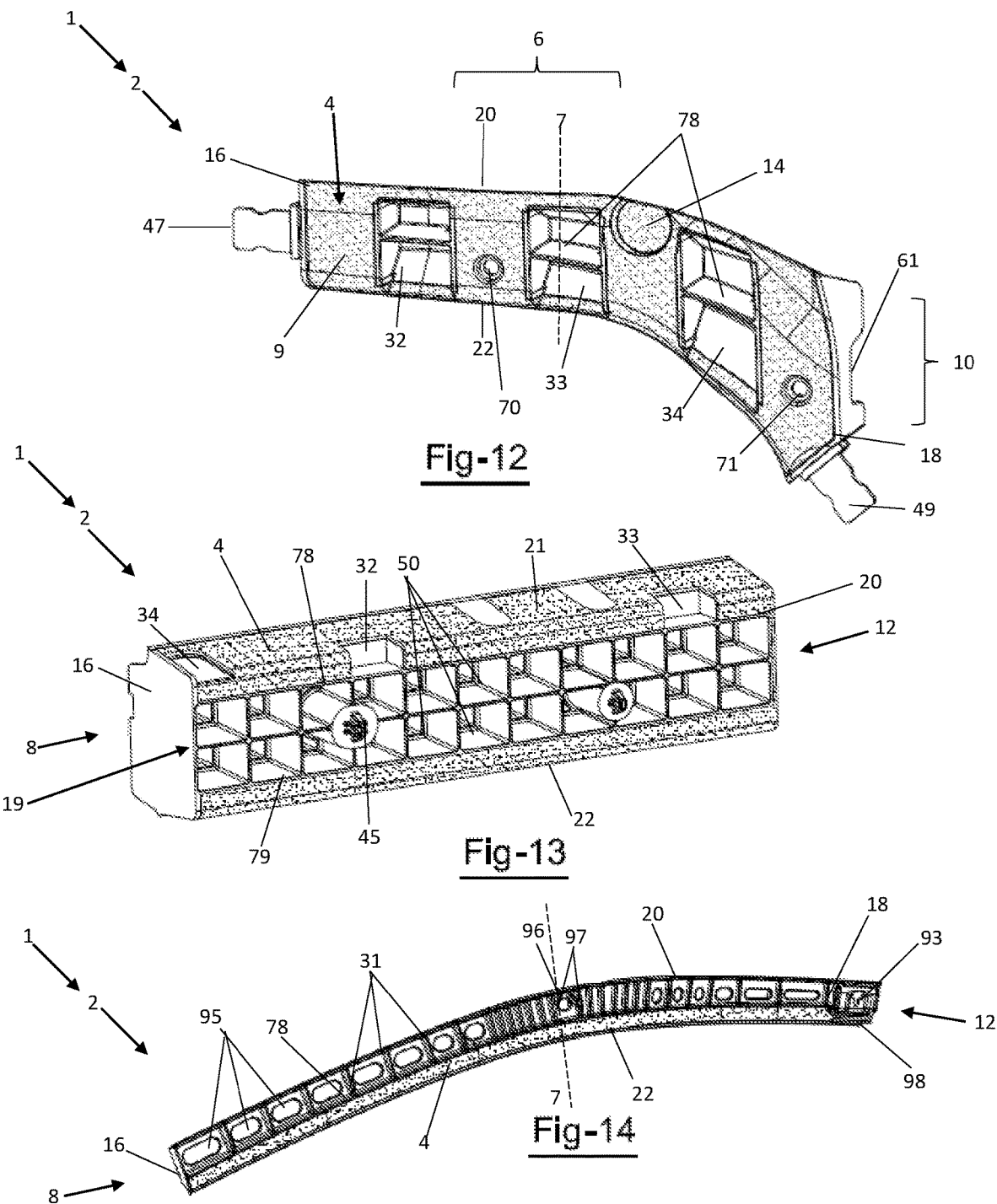

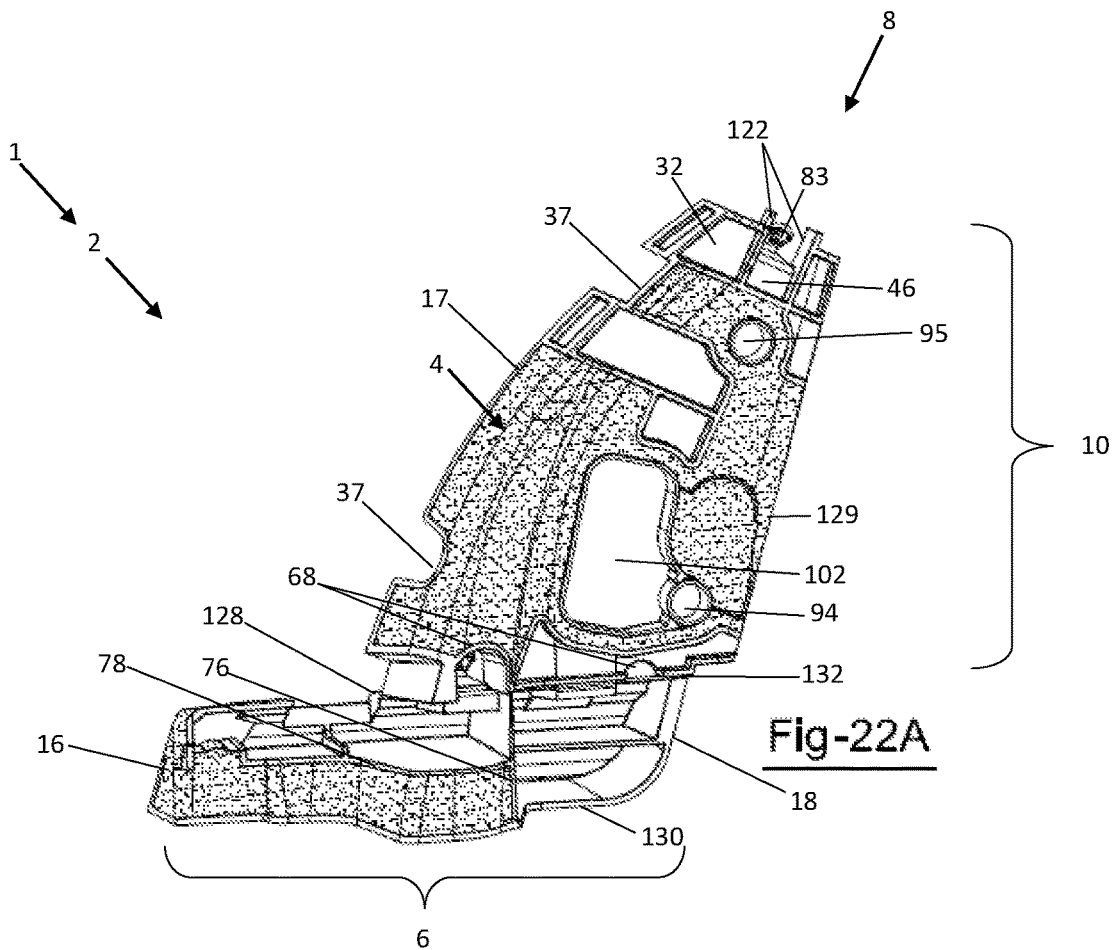
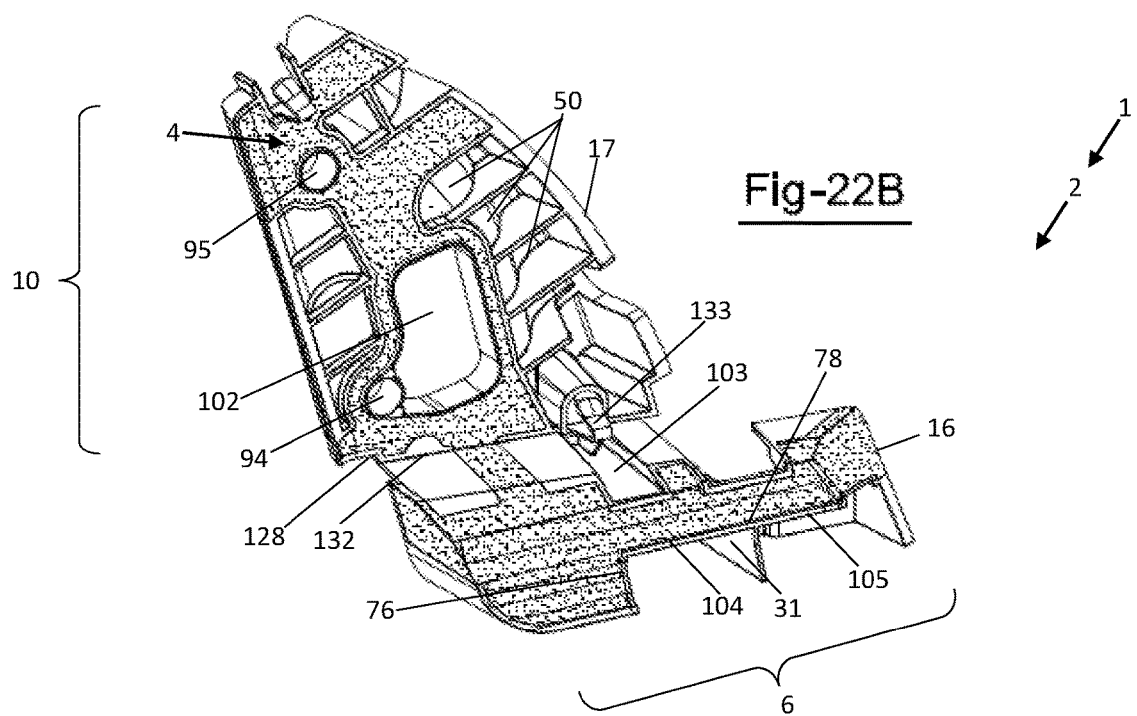

REINFORCEMENT DEVICES

FIELD

The present teachings are predicated upon the provision of a reinforcement system and method for reinforcing and/or sealing of a cavity. The reinforcement system includes a carrier having a plurality of rib and/or cellular structures and may include one or more restrictors for assisting in the placement, location and/or restricting movement of a secondary material on the carrier.

BACKGROUND

For many years industry, and particularly the transportation industry has been concerned with providing reinforcement and sealing to articles of manufacture such as transportation vehicles. In turn, a wide variety of materials and parts for providing such functional attributes have been developed. Further, there is an ongoing need for improving vehicle performance in the event of collisions or other impacts while maintaining or improving competing requirements, such as vehicle weight and fuel efficiency. One particular aspect that has been addressed is crash impact to front, rear, and/or side body panels and pillars, and preventing deformation of automotive body panels and pillars into the passenger compartment. While standard heavier metal reinforcements provide effective structural reinforcement, they result in heavier vehicles with reduced fuel efficiency. Thus, there is a need for structural reinforcements in vehicles which allow vehicles to meet crash impact requirements and increasing restrictions on fuel efficiency requirements.

The present teachings seek to provide improved reinforcement and/or sealing devices for providing such functional attributes.

SUMMARY OF THE INVENTION

The present teachings provide improved systems and methods for reinforcing and/or sealing a hollow member. The present teachings include one or more unique carrier configurations and a secondary material placed thereover for providing structural reinforcement and/or sealing.

The present teachings may provide for a device including a variety of distinct material layers. The device may include a carrier having a length extending along an axis between a first end and a second end. The carrier may have a longitudinal axis and may include one or more structures arranged in a direction perpendicular to the longitudinal axis, parallel to the longitudinal axis, or arranged at an angle that is skew in relation to the longitudinal axis. The carrier may also include one or more walls joined together to form one or more cavities (e.g., wells) extending along an axis. The carrier may have a cross-sectional shape roughly corresponding to the cross-sectional shape of interior of a hollow structural member. The device may also include one or more secondary materials placed over the carrier. The secondary material may be an adhesive, a sealant, a foam, or some combination thereof. The secondary material may be an activatable material, such that the material is configured to expand, seal, reinforce, or a combination thereof upon application of a selectable stimuli. Upon activation the secondary material may foam, adhere, cure or some combination thereof so that the cavity which receives the device is sufficiently sealed and/or reinforced. The device may include one or more guiding features located on or integrated with the carrier. The one or more guiding features may be configured to receive the secondary material and limit and/or guide movement of the secondary material with respect to the carrier.

The device may include one or more guiding features (e.g., restrictors) integrally formed with the carrier to form a unitary structure. The one or more guiding features are configured to limit movement of the activatable material with respect to the carrier. The system may further include one or more attachment portions located at the first, second or both ends of the carrier. The one or more attachment portions may be configured for engaging the hollow structural member, connecting to an additional device, or both.

It should be appreciated that other features and aspects of the present teachings include methods of forming the devices as described herein, methods of reinforcement of a structural member, or otherwise.

BRIEF DESCRIPTION OF THE DRAWINGS

FIG. 2A illustrates a perspective view of a central portion the view of the device as shown at FIG. 1A.

FIG. 2B illustrates a perspective view of a central portion of the device as shown at FIG. 1B.

FIG. 3A shows a perspective view of a first surface of an exemplary reinforcement device in accordance with the present teachings.

FIG. 3B shows a perspective view of a second surface that opposes the first surface of the reinforcement device of FIG. 3A.

FIG. 3C illustrates a close-up view of an attachment projection and terminating end of the device of FIGS. 3A-3B.

FIG. 8 illustrates a perspective view of an exemplary device in accordance with the present teachings.

FIG. 9 illustrates a perspective view of an exemplary device in accordance with the present teachings.

FIG. 12 illustrates a perspective view of an exemplary device in accordance with the present teachings.

FIG. 13 illustrates a perspective view of an exemplary device in accordance with the present teachings.

FIG. 14 illustrates a perspective view of an exemplary device in accordance with the present teachings.

FIG. 22A illustrates a perspective view of a first surface of an exemplary device in accordance with the present teachings.

FIG. 22B illustrates a perspective view of an opposing second surface of the device shown in FIG. 22A.

DETAILED DESCRIPTION

Figure 1A:
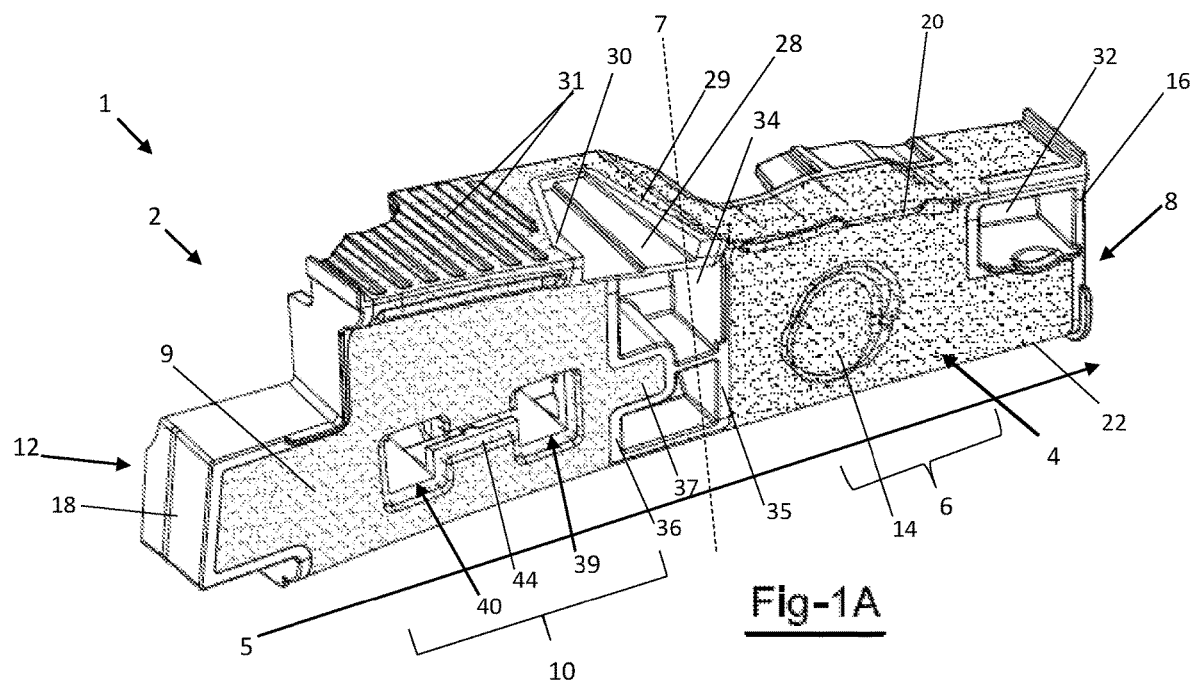
FIG. 1A shows a perspective view of a first surface of an exemplary reinforcement device in accordance with the present teachings.

The present teachings meet one or more of the above needs by the improved devices and methods described herein. The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

This application claims the benefit of the filing date of U.S. Provisional Application Ser. No. 62/858,628, filed Jun. 7, 2019, the contents of that application being incorporated by reference herein for all purposes.

The teachings herein may generally relate to structural reinforcement devices. The devices described herein may also provide functions such as sealing and baffling. The reinforcement devices described herein may be specifically adapted to provide sealing, baffling or reinforcement within a cavity of a vehicle. It is also contemplated that the reinforcement structure may be applied (e.g., assembled) to various articles of manufacture such as boats, trains, buildings, homes, furniture, or the like. The term "vehicle" as used herein may be used to describe any transportation vehicle, including a boat, train, automotive vehicle, plane, motorcycle, and the like.

The device may find particular use in absorbing impact associated with an impact load. An impact load may be understood as a force generated by impact to a surface of a vehicle, such as during a collision. The impact load may be a side impact (passenger or driver side), a rear impact, or front impact. The device may be useful in reinforcing a cavity in a body panel, body pillar, crash beam, or elsewhere on a vehicle body. For example, the reinforcement structure may be disposed within a cavity of an A-Pillar, B-pillar, C-Pillar, beltline, cowl, door panel, frame system, quarter panel, dash panel, roof system, rocker panel, wheel house, windshield, the like, or any combination thereof. The device may absorb and distribute impact such that at least a portion of the impact load is not transferred into the passenger compartment.

The composite reinforcement includes a carrier. The carrier may include a means to affix the structural reinforcement to a surface. The carrier may be formed to absorb and/or distribute energy from an impact load. The carrier may have any size, shape, and/or configuration to affix the structural reinforcement to a surface, absorb and/or distribute energy from an impact load; provide a surface of secondary material, or any combination thereof. Features formed as part of the carrier may include a base structure and one or more projections. Such features may be integrally molded or separately formed. The carrier may be a one-piece structure or may be comprised of multiple pieces. The carrier may include one or more secondary materials which may be located only onto select portions of the carrier or may be located to substantially cover the entirety of the carrier. The carrier may include one or more portions of secondary material adjacent to one another. The carrier may include a plurality of projections. The carrier may include one or more cell-like structures. The carrier may include one or more walls. The carrier may include one or more ribs. The carrier may include one or more holes (e.g., openings, apertures, or through-holes). The one or more walls may be formed by a plurality of projections. Carriers made in accordance with the present teachings may include one or more walls having a first surface and a generally opposing second surface.

The carrier may include a plurality of projections. The plurality of projections may function to affix the reinforcement to a surface, absorb and/or distribute energy from an impact load; provide a surface for receiving secondary material, connect with other projections, assist in locating the device into a cavity, or any combination thereof. The plurality of projections may be any size, shape, and/or configuration. The plurality of projections may be walls, ribs, apertures, bridges, channels, bodies, attachments, reinforcements, attachments, or a combination thereof. Two or more of the plurality of projections may connect and create one or more reinforcing cells, one or more reinforcing cavities, one or more reinforcing cutaways, or a combination thereof.

The device may include one or more fasteners. The one or more fasteners may function to affix the composite reinforcement to a surface, such as one or more walls of a cavity, or to a second device. The one or more fasteners may have any size, shape, or configuration to affix the structural reinforcement to a surface. The device may include a single fastener or a plurality of fasteners. The one or more fasteners may be integrally formed with the carrier or separately formed from the carrier. The one or more fasteners may be formed from the same material as the carrier or from materials that are dissimilar from that of the carrier. The device may include one or more fasteners that are located so that they correspond with openings formed in a wall. The device may include one or more fasteners that cooperate with one or more edges of a cavity or second device. The one or more fasteners may include a threaded fastener, an opening for receiving a fastener, a tree fastener, an arrowhead fastener, a push pin fastener, a clip fastener, a hook-like fastener, a friction-fit fastener, the like, or any combination thereof. The one or more fasteners may be located into and/or through an opening of a surface, such as a cavity wall, to affix the structural reinforcement. The one or more fasteners may receive a surface, such as a protrusion or extension from a cavity wall, or a second device to affix the structural reinforcement.

The device may include components made of one or more materials. The one or more materials may be any material which allows the carrier to absorb and/or distribute energy from an impact load; have plastic deformation due to an impact load, transfer an impact load from a first portion to a second portion, allow the carrier to be a unitary, integrally formed, one-piece structure, or any combination thereof. Suitable materials for the carrier can include for example, and without limitation, a polymeric material such as Nylon or other polyamides, polysulfone, polyester, polypropylene, polyethylene, polyurethane, thermoplastic epoxy resin, sheet molding compound or the like, which may be filled or unfilled (e.g., filled with glass, aramid, or other reinforcement fibers); molded, extruded or otherwise-shaped. The device (including the carrier) may include one or more metallic components, such as aluminum, magnesium, steel and titanium, an alloy derived from the metals, and even a metallic foam. The carrier (or any component of the device) may be formed of a thermoset or thermoplastic polymer. The device may comprise a composite material, a woven material, a nonwoven material, or a combination thereof. The carrier may include at least one insert made of a different material than the carrier. For example, if the carrier is a molded polymeric carrier, the insert may be made of a different material. The insert may have a higher yield strength than the molded polymeric carrier. Yield strength may be measured according to ASTM D695 and/or ASTM D790. At least a portion of the carrier may include a localized fiber reinforcement. The localized fiber reinforcement may be woven, nonwoven, or a combination thereof. The carrier may also be formed of a molding compound such as a sheet molding compound (SMC), a bulk molding compound (BMC), a thick molding compound (TMC) or the like. Exemplary compositions and formation of carriers is discussed in U.S. Pat. Nos. 7,313,865 and 7,503,620 which are incorporated herein by reference for all purposes.

The device may include at least one portion or at least one component that functions to receive an impact load, absorb and/or distribute energy from an impact load, transfer an impact load to another portion, reduce deformation of another portion, include a plurality of projections, deform or collapse in stages, reside within an opening of cavity wall, or any combination thereof. The at least one portion or component may have any shape, size, or configuration to receive an impact load, absorb and/or distribute energy from an impact load, transfer an impact load to another portion, reduce deformation of another portion, include a plurality of projections, deform or collapse in stages, or any combination thereof. One or more portions or components for achieving such function may be adjacent to one or more additional portions. For example, the carrier may include a first portion adjacent to a second portion. At least one portion (e.g., a first portion) may be located within a same cavity or an adjacent cavity as a second portion. At least one portion (e.g., a first portion) may receive an impact load before a second portion. A first portion may absorb at least some of the energy of the impact load before transferring some of the impact load to a second portion. A portion may include a plurality of projections to absorb at least a portion of the impact load. A first portion may be connected to a second portion by at least one base wall. At least one first portion may extend, protrude, or be adjoining at least one second portion. A first portion may have a smaller cross section than a second portion. The cross section of a first portion may be at least 10%, 20%, 30%, or even at least 50% smaller than the cross section of a second portion. A first portion having a smaller cross section may be adapted to cooperate with a wall of a cavity. A first portion having a smaller cross section may extend through a wall of a cavity. For example, when inserted into a cavity, a first portion may be inserted through an opening on one side of a wall and a second portion may reside on an opposing side of the wall. Insertion of a portion of a carrier through an opening can be found in U.S. Pat. No. 6,607,238, which is incorporated herein by reference for all purposes.

The device may include a secondary material. The secondary material may be located on an exterior surface of the carrier, in a cavity of the carrier, on an interior surface of the carrier, or some combination thereof. The secondary material may be activated to expand. The secondary material may have an expansion of 0% and 3000% or more upon activation, as compared to the secondary material in its green state (e.g., prior to activation). Activation may be thermally triggered, however, other agents may be employed for realizing activation by other means, such as moisture, radiation, or otherwise. The secondary material may be a two-part material that activates when the two parts are combined. Such activation may occur at room temperature.

The secondary material may typically include a polymeric material. Such polymeric material may comprise a polymeric admixture, which may include a variety of different polymers, such as thermoplastics, elastomers, plastomers combinations thereof or the like. For example, and without limitation, polymers that might be appropriately incorporated into the polymeric material include halogenated polymers, polycarbonates, polyketones, urethanes, polyesters, silanes, sulfones, allyls, olefins, styrenes, acrylates, methacrylates, epoxies, silicones, phenolics, rubbers, polyphenylene oxides, terephthalates, acetates (e.g., EVA), acrylates, methacrylates (e.g., ethylene methyl acrylate polymer)

or mixtures thereof. Other potential polymeric materials may be or may include, without limitation, polyolefin (e.g., polyethylene, polypropylene) polystyrene, polyacrylate, poly(ethylene oxide), poly(ethyleneimine), polyester, polyurethane, polysiloxane, polyether, polyphosphazine, polyamide, polyimide, polyisobutylene, polyacrylonitrile, poly(vinyl chloride), poly(methyl methacrylate), poly(vinyl acetate), poly(vinylidene chloride), polytetrafluoroethylene, polyisoprene, polyacrylamide, polyacrylic acid, polymethacrylate.

The polymeric material typically comprises a substantial portion of the secondary materials (e.g., up to 85% by weight or greater). Preferably, the polymeric secondary material comprises about 15% to about 85%, more preferably about 20% to about 70% and even more preferably about 30% to about 65% by weight of the two or more secondary materials.

It is possible that the polymeric material includes one or more acrylates. The acrylates may include, for example, simple acrylate, methyl acrylate, ethyl acrylate, butyl acrylate, vinyl acrylate, copolymers or combinations thereof or the like. Moreover, any of these acrylates may include other chemical groups such as epoxy, ethylene, butylene, pentene or the like for forming compounds such as ethylene acrylate, ethylene methyl acrylate and so on, and additionally for forming copolymers or combinations thereof or the like. When included, the one or more acrylates typically comprise about 10% or less to about 95% or greater, more preferably about 20% to about 85% and even more preferably about 35% to about 75% by weight of the polymeric secondary material. An example acrylate is a copolymer of butyl acrylate and methyl acrylate and more particularly a copolymer of an ethylene butyl acrylate and ethylene methyl acrylate. An example of such a copolymer is sold under the tradename LOTRYL 35BA40. Another example acrylate is an epoxy modified (e.g., epoxidized) acrylate copolymer. An example of such a copolymer is sold under the tradename ELVALOY 4170.

It is also possible that the polymeric secondary material includes one or more acetates. The acetates may include, for example, acetate, methyl acetate, ethyl acetate, butyl acetate, vinyl acetate, copolymers or combinations thereof or the like. Moreover, any of these acetates may include other chemical groups such as epoxy, ethylene, butylene, pentene or the like for forming compounds such as ethylene acrylate, ethylene methyl acrylate and so on and additionally for forming copolymers or combinations thereof or the like. When included, the one or more acetates typically comprise about 5% or less to about 50% or greater, more preferably about 7% to about 35% and even more preferably about 15% to about 25% by weight of the polymeric secondary material.

An example acetate is ethylene vinyl acetate (EVA). One example of such an acetate is a relatively high ethylene content EVA sold under the tradename ESCORENE UL-7760. Another example of such an acetate is a relatively low molecular weight/low melt index EVA sold under the tradename ESCORENE UL-MV02514.

The polymeric secondary material may comprise a polyurethane-based foam or a phosphate ester-based foam. The phosphate ester-based foam may be derived from cashew nutshell liquid (CNSL).

The polymeric secondary material may include an epoxy resin. Epoxy resin is used herein to mean any of the conventional dimeric, oligomeric or polymeric epoxy materials containing at least one epoxy functional group. The polymer-based materials may be epoxy containing materials having one or more oxirane rings polymerizable by a ring opening reaction. For example, the secondary material may include up to about 20% of an epoxy resin. In further example, the secondary material includes between about 0.1% and 50% by weight epoxy resin. The epoxy may be aliphatic, cycloaliphatic, aromatic or the like. The epoxy may be supplied as a solid (e.g., as pellets, chunks, pieces or the like) or a liquid (e.g., an epoxy resin). The epoxy may include an ethylene copolymer or terpolymer that may possess an alpha-olefin. As a copolymer or terpolymer, the polymer is composed of two or three different monomers, i.e., small molecules with high chemical reactivity that are capable of linking up with similar molecules. In one example, an epoxy resin is added to the secondary material to increase properties such as adhesion, cohesion or the like of the material. Additionally, the epoxy resin may strengthen cell structure when the secondary material is a foamable material. The epoxy resin may be a phenolic resin, which may be a novolac type or other type resin. The epoxy containing materials may include a bisphenol-A epichlorohydrin ether polymer, or a bisphenol-A epoxy resin which may be modified with butadiene or another polymeric additive.

A variety of tackifiers or tackifying agents may be included in the secondary materials. Exemplary tackifiers include, without limitation, resins, phenolic resins (e.g., thermoplastic phenolic resins), aromatic resins, synthetic rubbers, alcohols or the like. According to one preferred embodiment, a hydrocarbon resin (e.g., a C5 resin, a C9 resin, a combination thereof or the like) is employed as a tackifier. The hydrocarbon resin may be saturated, unsaturated or partially unsaturated (i.e., have 1, 2, 3 or more degrees of unsaturation). One example of a preferred hydrocarbon resin is a coumarone-indene resin. Another example of a preferred hydrocarbon resin is sold under the tradename NORSELENE® S-105. When used, the tackifier may comprise about 0.1% or less to about 30% or greater, about 2% to about 25% and even more preferably about 6% to about 20% by weight of the two or more secondary materials. Advantageously, the tackifier may be able to assist in controlling cure rates for producing a more consistent or predictable expansion for the secondary material.

One or more blowing agents may be added to the one or more secondary materials for producing inert gasses that form, as desired, an open and/or closed cellular structure within the secondary material. In this manner, it may be possible to lower the density of articles fabricated from the secondary material. In addition, the material expansion helps to improve sealing capability, substrate wetting ability, adhesion to a substrate, acoustic damping, combinations thereof or the like. The blowing agent may include one or more nitrogen containing groups such as amides, amines and the like. Examples of suitable blowing agents include azodicarbonamide, dinitrosopentamethylenetetramine, 4,4i-oxy-bis-(benzenesulphony-lhydrazide), trihydrazino-triazine and N, Ni-dimethyl-N,Ni-dinitrosoterephthalamide.

An accelerator for the blowing agents may also be provided in the one or more secondary materials. Various accelerators may be used to increase the rate at which the blowing agents form inert gasses. One preferred blowing agent accelerator is a metal salt, or is an oxide, e.g. a metal oxide, such as zinc oxide. Other preferred accelerators include modified and unmodified thiazoles or imidazoles, ureas or the like. Amounts of blowing agents and blowing agent accelerators can vary widely within the two or more secondary materials depending upon the type of cellular structure desired, the desired amount of expansion of the secondary material, the desired rate of expansion and the like. For example, ranges for the amounts of blowing agents, blowing agent accelerators or both together in the two or more secondary materials range from about 0% by weight to about 25%, about 2% to about 20% and even about 7% to about 15% by weight of the secondary material, depending on the desired rate of volumetric expansion. It is contemplated that at least one of the two or more secondary materials may omit a blowing agent.

One or more curing agents and/or curing agent accelerators may be added to the two or more secondary materials. Amounts of curing agents and curing agent accelerators can, like the blowing agents, vary widely within the two or more secondary materials depending upon the type of cellular structure desired, the desired amount of expansion of the blended thermoplastic material, the desired rate of expansion, the desired structural properties of the blended thermoplastic material and the like. For example, amounts of the curing agents, curing agent accelerators of both together present in the one or more secondary materials range from about 0% by weight to about 7% by weight.

The curing agents may assist the one or more secondary materials in curing by crosslinking of the polymers, epoxy resins (e.g., by reacting in stoichiometrically excess amounts of curing agent with the epoxide groups on the resins) or both. It is also possible that the curing agents may assist in thermosetting the one or more secondary materials. Useful classes of curing agents may be materials selected from aliphatic or aromatic amines or their respective adducts, amidoamines, polyamides, cycloaliphatic amines, (e.g., anhydrides, polycarboxylic polyesters, isocyanates, phenol-based resins (such as phenol or cresol novolac resins, copolymers such as those of phenol terpene, polyvinyl phenol, or bisphenol-A formaldehyde copolymers, bishydroxyphenyl alkanes or the like), peroxides or mixtures thereof. Particular preferred curing agents include modified and unmodified polyamines or polyamides such as triethylenetetramine, diethylenetriamine tetraethylenepentamine, cyanoguanidine, dicyandiamides and the like. An accelerator for the curing agents (e.g., a modified or unmodified urea such as methylene diphenyl bis urea, an imidazole or a combination thereof) may also be provided for preparing the secondary material.

Though longer curing times are also possible, curing times of less than 5 minutes, and even less than 30 seconds are possible for the secondary materials of the present teachings. Moreover, such curing times can depend upon whether additional energy (e.g., heat, light, radiation) is applied to the secondary material or whether the material is cured at room temperature.

The one or more secondary materials may also include one or more fillers or reinforcing components, including but not limited to particulated materials (e.g., powder), beads, microspheres, nanoparticles or the like. The filler may include a relatively low-density material that is generally non-reactive with the other components present in the one or more secondary materials. Examples of fillers and reinforcing components include silica, diatomaceous earth, glass, clay, talc, pigments, colorants, glass beads or bubbles, glass, carbon ceramic fibers, antioxidants, and the like. Such reinforcing components, particularly clays, may assist the secondary material in leveling itself during flow of the material. The clays that may be utilized may include nanoparticles of clay and/or clays from the kaolinite, illite, chloritem, smecitite or sepiolite groups, which may be calcined. Examples of suitable fillers include, without limitation, talc, vermiculite, pyrophyllite, sauconite, saponite, nontronite, montmorillonite or mixtures thereof. The clays may also include minor amounts of other ingredients such as carbonates, feldspars, micas and quartz. The fillers may also include ammonium chlorides such as dimethyl ammonium chloride and dimethyl benzyl ammonium chloride. Titanium dioxide might also be employed. One or more mineral or stone type fillers such as calcium carbonate, sodium carbonate or the like may be used as fillers. Silicate minerals such as mica may be used as fillers. It has been found that, in addition to performing the normal functions of a filler, silicate minerals and mica in particular may improve the impact resistance of the blended thermoplastic material. When employed, the fillers in the secondary material may range from 1% to 90% by weight of the secondary material. For example, the secondary material may include from about 3% to about 30% by weight, and in further example about 10% to about 20% by weight clays or similar fillers.

It is contemplated that one of the fillers or other components of the one or more secondary materials may be thixotropic for assisting in controlling the viscosity and thus the flow of the materials as well as properties such as tensile, compressive or shear strength in its green state, during activation and post-cure.

The devices described herein and the associated secondary materials may be positioned within a cavity of a transportation vehicle (e.g., an automotive vehicle) prior to electro-coating the vehicle. In the event that the secondary material is an activatable material, the material may be activated when subjected to heat during paint shop baking operations. In applications where the activatable material is a heat activated, thermally expanding material, an important consideration involved with the selection and formulation of the material comprising the activatable material is the temperature at which a material reaction or expansion, and possibly curing, will take place. More typically, the activatable material becomes reactive at higher processing temperatures, such as those encountered in an automobile assembly plant, when the material is processed along with the automobile components at elevated temperatures or at higher applied energy levels, e.g., during paint or e-coat curing or baking steps. While temperatures encountered in an automobile assembly operation may be in the range of about 140° C. to about 220° C., (e.g., about 148.89° C. to about 204.44° C. (about 300° F. to 400° F.)), body and paint shop applications are commonly about 93.33° C. (about 200° F.) or slightly higher. Following activation of the activatable material, the material will typically cure. Thus, it may be possible that the activatable material may be heated, it may then expand, and may thereafter cure to form a resulting foamed material.

The devices described herein may be utilized for absorbing energy in the event of an impact to a vehicle. The carrier may operate in a staged collapse in response to an impact load. Collapsing the carrier may include a first portion of the carrier collapsing prior to a second portion of the carrier. The first portion may collapse toward the second portion. The first portion may prevent or minimize collapsing of the second portion. During collapsing, at least one first projection may plastically deform before at least one second projection plastically deforms in response to the impact load. The at least one second projection may receive a portion of the impact load after the at least one first projection deforms to a certain height or other pre-determined condition.

Figure 1B:
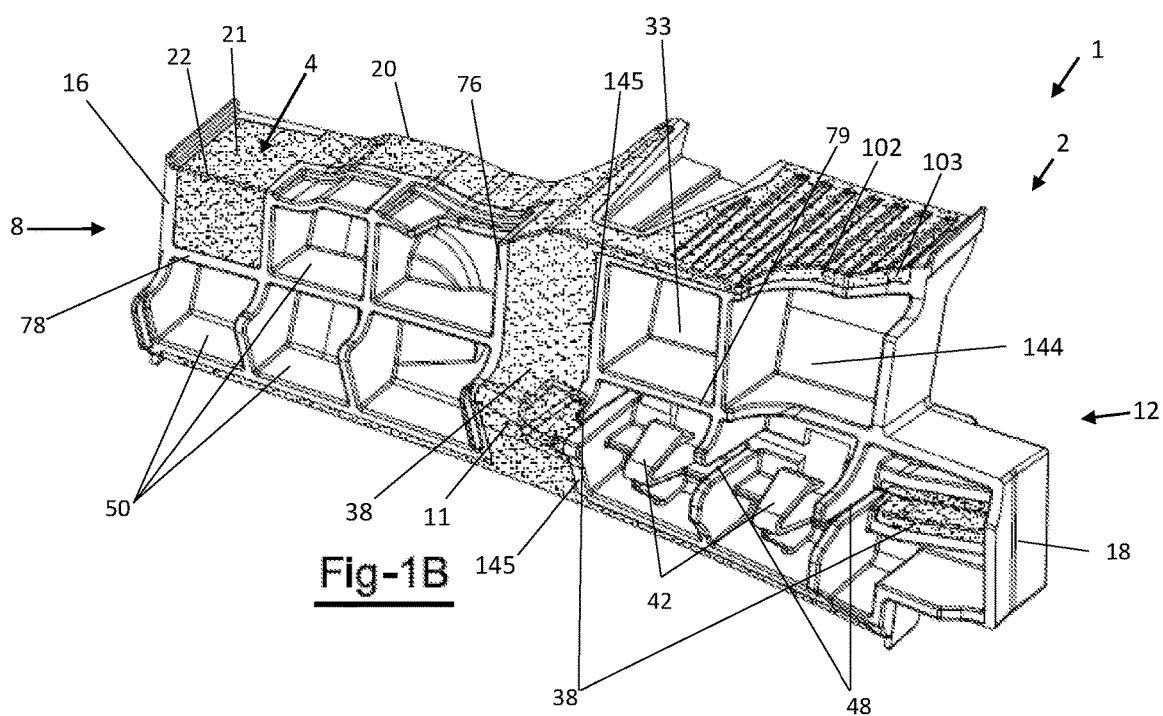
FIG. 1B shows a perspective view of a second surface that opposes the first surface of the reinforcement device of FIG. 1A.

FIG. 1A shows a perspective view of a first surface 9 of a device 1 for reinforcement of a vehicle cavity consistent with the teachings herein. The device 1 includes a carrier 2 and a secondary material 4. The carrier has a first portion 6 with a first end 8, and a second portion 10 with a second end 12. The first end 8 and the second end 12 are located on opposite ends of the longitudinal axis 5 of the device. The first portion 6 extends from a midpoint 7 of the carrier to the first end 8. The second portion 10 extends from the midpoint 7 to the second end 12. The first portion 6 includes a depression 14 covered with secondary material 4. The depression has an oblong shape and is located between a first end wall 16 and the midpoint 7 of the carrier. The first portion 6 has a reinforcement 32 connecting the first end wall 16 and a first edge 20. The first edge 20 is raised. The reinforcement 32 is substantially free of secondary material 4. Most of the first portion 6 is filled with secondary material 4, extending from the first edge 20 and to a second edge 22, and from the first end wall 16 to reinforcement 34. The first edge 20 extends along the longitudinal axis 5 of the carrier. The first edge 20 is substantially covered in the secondary material 4 except for the side partition 28. The side partition 28 has a generally "v" shape with a first partition edge 29 and a second partition edge 30. The side partition 28 is substantially free of secondary material between the first partition edge 29 and the second partition edge 30. A plurality of ribs 31 covered in secondary material 4 are located adjacent to the second partition edge 30 of the side partition 28. The side partition 28 connects to a reinforced cavity 34 at the midpoint 7 of the carrier 2. The reinforced cavity 34 is substantially free of secondary material, with a first wall 35 and a second wall 36. The second wall 36 of the reinforced cavity is notched 37 to accommodate a channel 38 on the second surface 11 of the structure (FIG. 1B). The channel 38 is disposed between the midpoint 7 and the second end 12. Two access holes 39, 40 are located along the channel 38, each with an engagement piece 42. The two access holes 39, 40 are connected by a passage 44 corresponding with the location of the channel 38. The area surrounding the two access holes 39, 40 and the passage 44 on the first surface 9 are free of secondary material.

FIG. 1B illustrates a perspective view of the second surface 11 (opposing the first surface shown at FIG. 1A) of the device 1. Extending between the first end wall 16 and transverse wall 76 are a plurality of reinforcing cells 50, connected with longitudinal wall 78 disposed in between the reinforcing cells 50 along the longitudinal axis 5. The longitudinal wall 78 extends from the first end wall 16 towards the second end 12, stopping at transverse wall 76. Secondary material 4 is located on the second surface 11 between transverse wall 76 and transverse wall 145. Transverse wall 145 is split to accommodate channel 38. Reinforcements 33 and 144 are connected together and extend between the first side 21 and wall 79. The reinforcements 144 at the first side 21 has two rounded cutaways 102, 103. A channel 38 is located between wall 79 and the second side 23. The channel 38 includes channel guides 48 with engagement pieces 42 disposed between.

FIG. 2A shows the second end 12 of the second surface 11 which includes the channel 38. The channel 38 includes a first channel portion 141, a second channel portion 142, and a third channel portion 143. The channel 38 includes a set of guides 48 which assist with locating the reinforcing structure with the door beltline. The first channel portion 141 and the third channel portion 143 have the secondary material 4 located therein. The second portion 142 includes two engagement pieces 42 located with access holes 39 and 40. The device 1 is configured to accept a door beltline into the channel 38, such that the engagement pieces 42 contact the beltline, creating an interference fit. Once located with the beltline, and upon activation, the secondary material 4 adheres the reinforcing structure to the vehicle.

FIG. 2B shows a close-up view of a first side 21 of carrier 2. The side partition 28 extends from the first edge 20 towards the second 11, but stops before making contact with the second surface, allowing secondary material to cover the remaining portion of the first side 21. Cutaways 102, 103 are located in the first side 21, cutting into ribs 31. Cutaway 103 further extend into wall 146. In this view, the first section 141 and the second section 142 of channel 38 can be viewed. The first section 141 of channel 38 is coated in secondary material 4. The second section 142 of the channel 38 includes channel guides 48 with engagement pieces 42 therebetween.

FIG. 3A illustrates a perspective view of a device 1. The device includes a carrier 2 and a secondary material 4. The carrier 2 and the attachment portion both include a plurality of longitudinal and transverse reinforcing ribs 31, 41. The base 26 of the carrier 2 includes a first end wall 16 and a second end wall 18, each with a raised edge. The secondary material 4 is selectively disposed on portions of the carrier 2, particularly between the reinforcing ribs 31. The base 26 of the carrier has a first reinforcement 32 and a second reinforcement 33. The first reinforcement includes a top wall 51, a bottom wall 52, two side walls 53, 54, a pair of longitudinal ribs 41 and a pair of transverse ribs 43. The first reinforcement 32 extends from the first surface 9 towards the second surface 11 (FIG. 3B). The perimeter of the reinforcement cavity 32 is raised, preventing the secondary material 4 from entering the cavity 32. Similarly, the perimeter of the second reinforcement 33 includes end walls 55, 56, and side walls 57, 58 which are raised to assist in locating the secondary material 4 outside of the second reinforcement 33. The second reinforcement 33 is substantially free of the secondary material 4 between its walls and ribs. The first end wall 16 of the carrier and end wall 51 of the first reinforcement 32 form a first surface channel 60 for the secondary material 4 to span across the first surface 9 of the carrier 2. The end wall 52 and end wall 55 of the second reinforcement 33 form a second surface channel 61 on the carrier 2 for the secondary material 4. End wall 53 of the second reinforcement 33 and the second end wall 18 of the carrier 2 form a third surface channel 62 for the secondary material 4. The secondary material 4 surrounds the large transverse ribs 31 on the sides of the carrier 2.

FIG. 3B illustrates the second surface 11 of the device 1. The second surface 11 has a first edge 20 and a second edge 22 between the first end wall 16 and the second end wall 18. Longitudinal walls 78, 79 are located in the center section 19. A plurality of reinforcing cells 50 are disposed between the first edge 20 and longitudinal wall 78, and between the second edge 22 and longitudinal wall 79. The center section 19 has reinforcing ribs 43 spanning between walls 78, 79. A bridge 87 is disposed across the center section 19 distal to the midpoint 7 and proximal to the first end wall 16. The second surface 11 of the device 1 includes attachment projections 83 located at the first end 8 and the second end 12.

FIG. 3C illustrates a close-up view of the attachment projection 83 located on the second end wall 18 of the device 1.

Figure 3D:
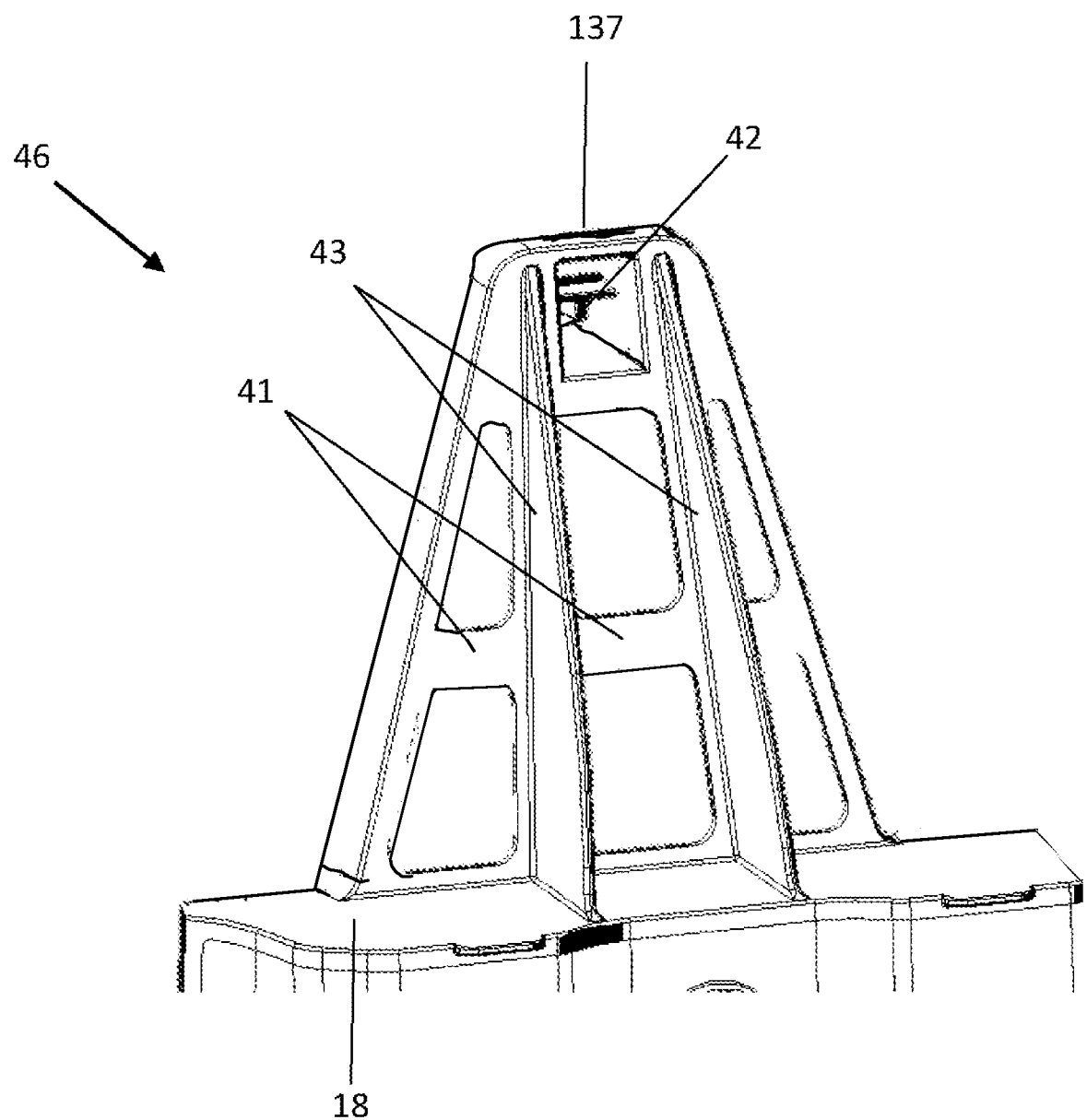
FIG. 3D illustrates a close-up view of an exemplary attachment portion in accordance with the present teachings.

FIG. 3D illustrates an attachment portion 46. The attachment portion 46 is made up of several longitudinal 43 and transverse ribs 41 that are free from the secondary material. The attachment portion 46 tapers from the second end wall 18 of the carrier 2 towards the mounting location 137. The attachment portion 46 has a generally triangular shape. The attachment portion 46 includes the mounting location 137 with the at least one engagement piece 42. The engagement piece 42 is configured to create an interference fit when engaged. The mounting location 137 is a significant distance away from the body of the device 1.

Figure 4:
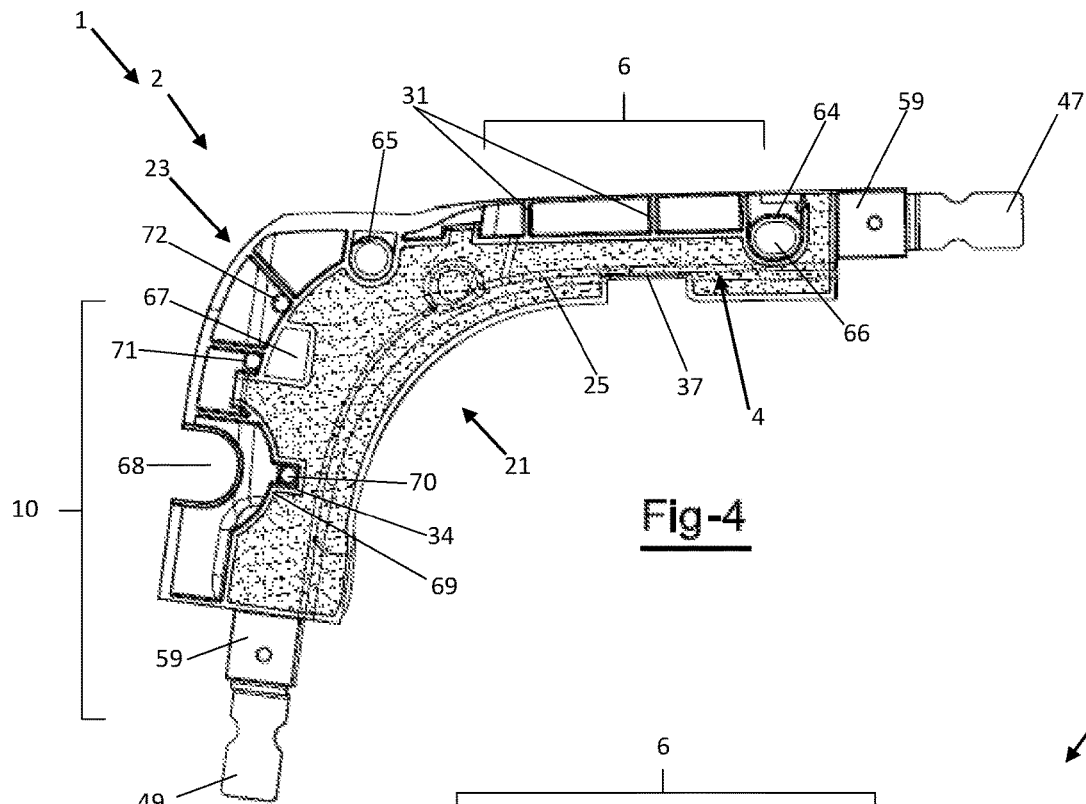
FIG. 4 illustrates a perspective view of an exemplary device in accordance with the present teachings.

FIG. 4 shows a device 1 which may be used to reinforce the area around a windshield consistent with the teachings herewith. The device 1 includes a carrier 2 and a secondary material 4. The carrier has a curved profile with a first section 6 and a second section 10. The first section 6 and the second section 10 each include an inner portion 21 and an outer portion 23. The outer portion 23 of both the first section 6 and the second section 10 each include a plurality of reinforcing ribs 31. The outer portion 23 of the first section 6 includes a first rounded projection 64 and a second rounded projection 65, each extending from the outer portion 23 towards the inner portion 21. Disposed within the rounded projections 64, 65 are raised passages 66. The second section 10 includes a trapezoidal aperture 67 in the carrier 2. The raised passages 66 in the first section 6 and the trapezoidal aperture 67 of the second section 10 are free from the secondary material 4. The outer portion 23 of the second section 10 has a semi-circular opening 68. The semi-circular opening 68 is surrounded by a curved wall 69. The curved wall 69 includes a cavity 34 with a first mounting hole 70. Two additional mounting holes 71, 72 are located between the ribs 31 in the second section 10. The inner portion 21 and a facing surface 25 of the first section 6 and the second section 10 are substantially coated in the secondary material 4. The inner portion 21 of the first section 6 is notched 37. The carrier includes a first attachment tab 47 and a second attachment tab 49. The first attachment tab 47 is inserted into the tab mount 59 on the distal end of the first section 6 and the second attachment tab 49 is inserted into the tab mount 59 on the distal end of the second section 10.

Figure 5:
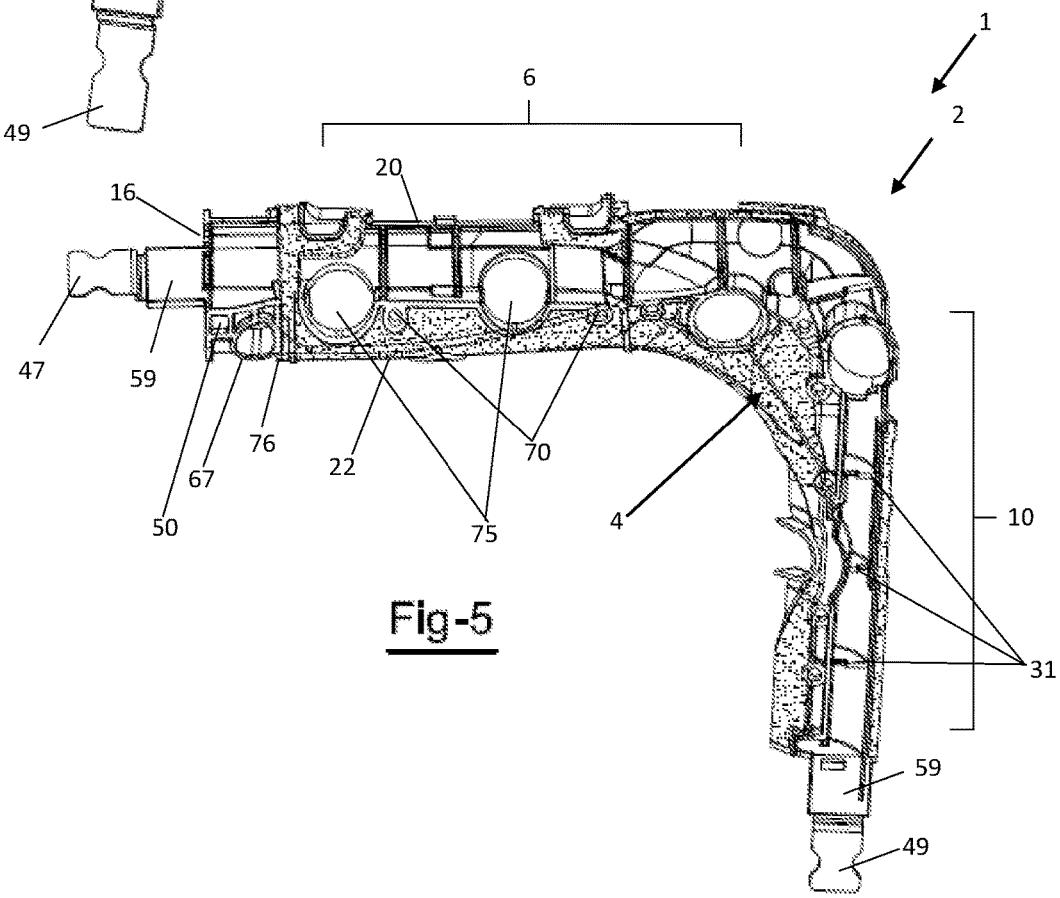
FIG. 5 illustrates a perspective view of an exemplary device in accordance with the present teachings.

FIG. 5 shows a device 1 consistent with the teachings herewith which may be used to reinforce the area around a windshield. The device 1 includes a carrier 2 and a secondary material 4. The carrier has a curved profile with a first section 6 and a second section 10. The first section 6 and the second section 10 each include a first edge 20 and a second edge 22. The first edge of both the first section 6 and the second section 10 each include a plurality of reinforcing ribs 31 extending into the carrier. The second edge 22 of the first section 6 and the second section 10 are substantially coated in the secondary material 4. The first edge 20 includes a semi-circular opening 68 substantially free of secondary material 4 on the inner portion of the opening. Located between the first edge 20 and the second edge 22 of the carrier 2 are a plurality of oblong through holes 75. The through holes 75 are disposed between the reinforcing ribs 31 on the first edge 20 and the secondary material 4 located on the second edge 22. The carrier 2 further includes a plurality of mounting holes 70 along the longitudinal axis 5 of the first section and the second section 10. The plurality of mounting holes 70 are disposed between the first edge 20 and the second edge 22. The distal end of the first section 6 of the carrier 2 includes an end wall 16 that runs perpendicular to the longitudinal axis 5 of the first section. The end wall 16 is intersected by a transverse wall 76. The transverse wall 76 is located proximal to the end wall 16. Disposed between the transverse wall 76 and the second edge 22 is an aperture 67. The aperture 67 is located on the second edge 22 between the end wall 16 and the transverse wall 76 extending into the carrier. A plurality of reinforcing cells 50 connect the end wall 16 and the transverse wall 76. The plurality of reinforcing cells 50 follow the contour of the aperture 67. The carrier includes a first attachment tab 47 and a second attachment tab 49. The attachment tabs 47, 49 are inserted into the tab mounts 59.

Figure 6A:
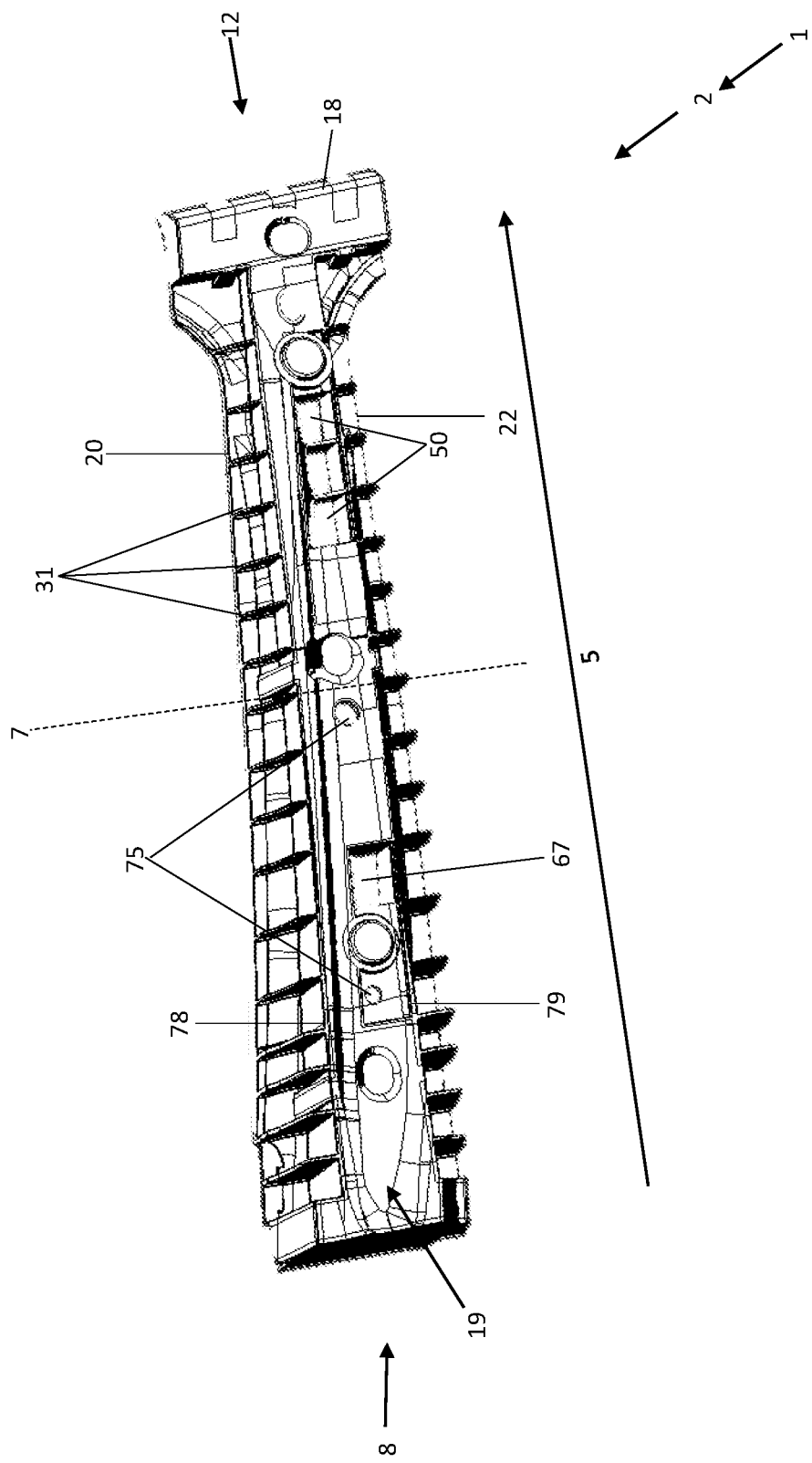
FIG. 6A illustrates a perspective view of a first surface of an exemplary device in accordance with the present teachings.
Figure 6B:
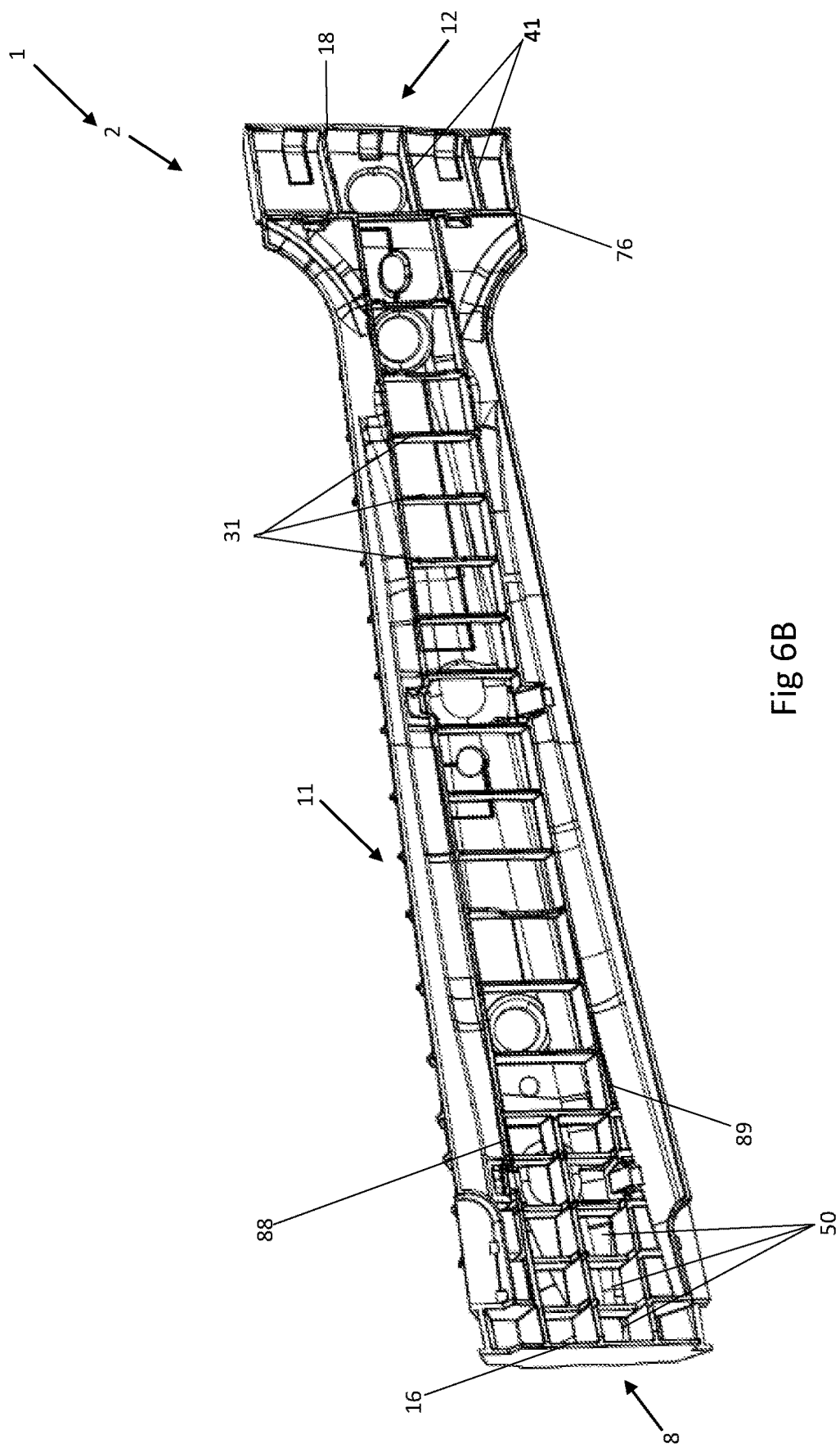
FIG. 6B illustrates a perspective view of an opposing second surface of the device shown in FIG. 6A.

FIG. 6A illustrates a perspective view of a first side 21 of a reinforcing structure 1 formed as an upper B-pillar reinforcement that is consistent with the teachings herewith. The reinforcing structure 1 has an elongated carrier 2 that has a slight taper from a first end 8 towards a second end 12. The second end 12 has a generally "t" shape with a second end wall 18 perpendicular to the longitudinal axis 5. From the second end wall 18, the second end 12 tapers towards the midpoint 7 of the carrier 2. The tapered portion of the second end 12 decreases in width. The carrier 2 includes a plurality of reinforcing ribs 31 extending from a first edge 20 to longitudinal wall 78 and from the second edge 22 towards to longitudinal wall 79. The center section 19 is located between walls 78, 79 and is raised along the longitudinal axis 5. The carrier 2 angularly decreases in height from wall 78 towards the first edge 20, and from wall 79 towards the second edge 22. The plurality of ribs 31 also have an angled profile, connecting the longitudinal walls 78, 79 to the first edge 20 and the second edge 22, respectively. The center section 19 includes a quadrilateral aperture 67, extending from a first surface 9, through the reinforcing structure 1, to a second surface (FIG. 6B). The quadrilateral aperture 67 is located proximal to the first end 8 and distal to the midpoint 7 of the reinforcing structure 1. The carrier includes reinforcing cells 50 that are located proximal to the second end 12 and distal to the midpoint 7 of the reinforcing structure 1. The center section 19 of the carrier 2 includes a plurality of through-holes 75 of varying size and shape.

FIG. 6B illustrates a perspective view of a second surface 11 of the device 1. The second surface 11 on the carrier 2 include longitudinal walls 78, 79 that extend from the first end wall 16 to the transverse wall 76 in the second end 12. Reinforcing ribs 41 are located between the transverse wall 76 and the second end wall 18. A plurality of reinforcing ribs 31 extend between the longitudinal walls 88, 89. At the first end 8, a plurality of reinforcing cells are located between walls 88, 89.

Figure 7A:
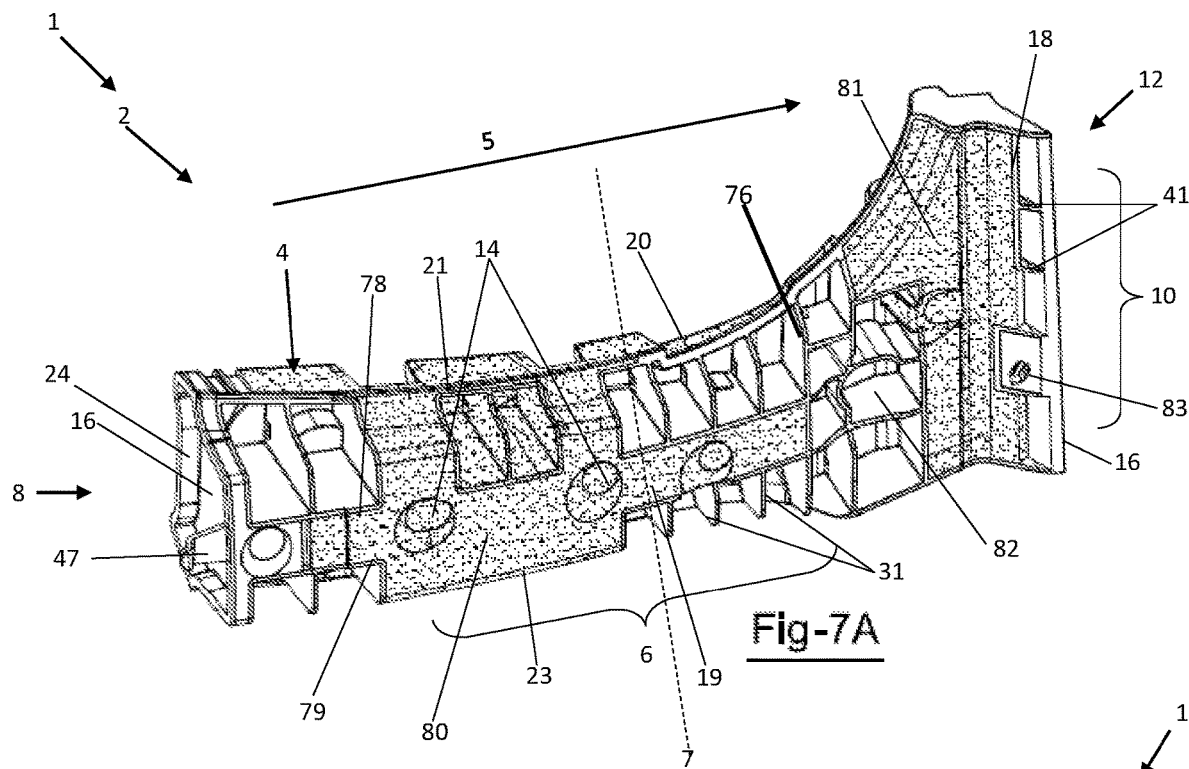
FIG. 7A illustrates a perspective view of a first surface of an exemplary device in accordance with the present teachings.

FIG. 7A shows a perspective view of a first side 21 of a device 1 formed as an upper B-pillar reinforcement that is consistent with the teachings herewith. The device 1 includes a carrier 2 and a secondary material 4. The carrier 2 has a first section 6 and a second section 10. The first section 6 is a generally elongated portion, extending from a first end 8 towards the second end 12. The second section 10 is a mounting portion with an end wall 18 at the second end 12. The second end wall 18 is perpendicular to the longitudinal axis 5. The second end wall includes an attachment projection 83. The second section 10 is connected to the carrier 2 along a transverse wall 76. Both the first section 6 and the second section 10 have a first side 21 that has a curved profile extending from the first end 8 to the second end 12. The first section 6 has a plurality of ribs 31 extending from the first side 21 towards a center section 19 of the carrier 2, and a plurality of ribs 31 extending from a second side 23 towards the center section 19. The plurality of ribs 31 are perpendicular to the longitudinal axis 5. The center section 19 is defined by longitudinal walls 78, 79 forming an area containing a first contiguous mass 80 of secondary material 4. Several depressions 14 are located in the center section 19. Together, the longitudinal walls 78, 79 and the plurality of ribs 31 contain the secondary material 4 to certain portions of the carrier 2. A second contiguous mass 81 of secondary material is located on the second section 10, from the second end wall 18 and extending proximally towards the midpoint 7. The second mass 81 of secondary material 4 follows the curved profile along the first edge 20. The second section 10 has a plurality of reinforcing cells distal to the transverse wall 76 with a semi-circular reinforcement 82 disposed in between. The second end wall 18 projects away from the carrier 2. The second end wall 18 has a plurality of reinforcing ribs 41 extending down the second end wall 18. The first end wall 16 has a raised edge 24 surrounding the distal side of the wall. Connected to the first end wall 16 is an attachment tab 47.

Figure 7B:
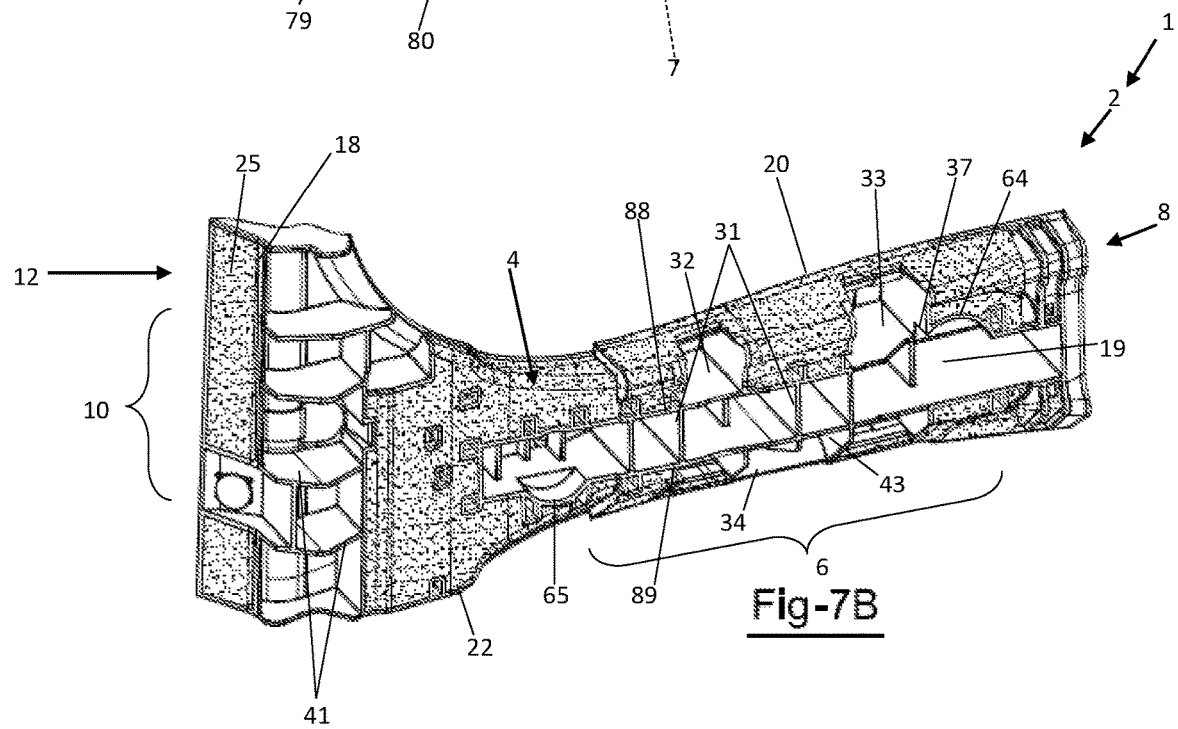
FIG. 7B illustrates a perspective view of an opposing second surface of the device shown in FIG. 7A.

FIG. 7B shows a perspective view of a second side 23 of the device 1. The second section includes a plurality of ribs 41 connection the second section to the first section. Secondary material 4 is located on the facing surface 25 of the second end wall 18. The first section 6 includes longitudinal walls 88, 89 which form the center section 19. Disposed between walls 88, 89 are a plurality of ribs 31. Reinforcements 32, 33 are connected to longitudinal wall 88 and extend towards the first edge 20. Reinforcements 32, 33 are surrounded by secondary material 4. Immediately distal to reinforcement 33 towards the first end 8 is a notched portion 37 of longitudinal wall 88. From the notch 37, the wall 88 projects towards the first edge 20 with a rounded protrusion 64. Similarly, longitudinal wall 89 includes a rounded projection 65 extending towards the second edge 22. Connected to and extending from longitudinal wall 89 towards the second edge 22 is reinforcement 34. Reinforcement 34 is divided by rib 43.

FIG. 8 illustrates a perspective view of a mid C-pillar device 1. The device 1 includes a carrier 2 and a secondary material 4. The carrier 2 has a first end 6 and a second end 10 with a first edge 20 and a second edge 22. The first end 8 and the second end 12 each include an attachment tab 47, 49. The attachment tabs 47, 49 are inserted into the tab mounts 59. The carrier 2 has a generally curved profile. The activatable material 4 follows the first edge 20 along the profile of the carrier 2. The first edge 20 includes two projections 63, the one projection located towards the first end 6 and the other projection located towards the second end 12. A plurality of ribs 31 extend from the second edge 22 of the carrier 2 towards the first edge 20, ending at a dividing wall 27. The carrier 2 includes a raised passage 66 extending from the first surface 9 to the second surface 11 between the dividing wall 27 and the second edge 22. A reinforced cavity 34 is located proximal to the second end 10, extending from the dividing wall 27 towards the first edge 20. The reinforced cavity 34 is surrounded by the secondary material 4 on three sides. A raised passage 86 extending from the first surface 9 to the second surface 11 is located within the reinforced cavity 34.

FIG. 9 shows a perspective view of a lower B-pillar device 1. The device 1 includes a carrier 2 and a secondary material 4. The carrier 2 has a first end 8 and a second end 12 with a first edge 20 and a second edge 22. The first end 8 includes a first end wall 16 that protrudes past the first edge 20. The protruded portion of the first end wall 16 has a quadrilateral shape, projecting outward from the first side 21. The first end wall 16 and the first side 21 are coated with the secondary material 4. Extending from the first end wall 16 is an attachment tab 47 connected to the end wall by a connection arm 45. Similarly, a second attachment tab 49 is located on the second edge 22 extending away from the carrier 2, proximal to the second end wall 18. The carrier 2 includes a plurality of reinforcing ribs 31. The plurality of reinforcing ribs 31 extend from the first edge 20 and the second edge 22 towards a center channel 19. The center channel 19 is defined by a pair of longitudinal channel walls 78, 79 located between the second end wall 18 and a transverse wall 76. The transverse wall 76 connects between the first edge 20 and the second edge 22. The center channel 19 is filled with secondary material 4.

Figure 10:
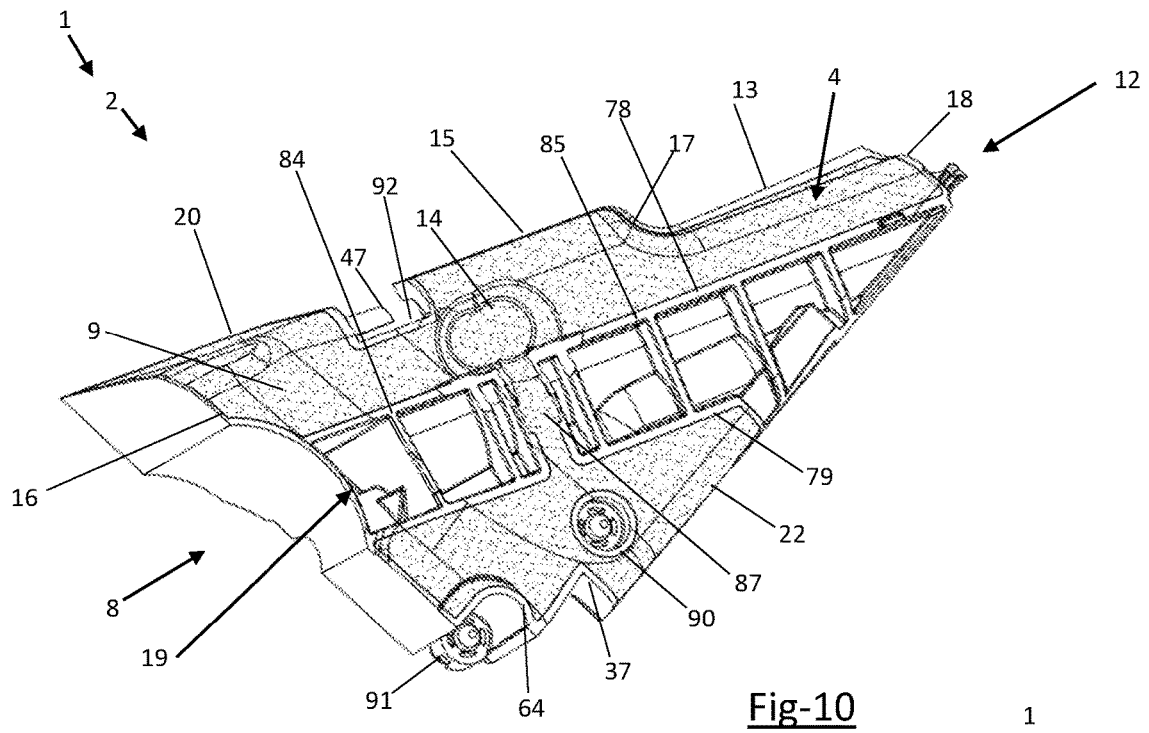
FIG. 10 illustrates a perspective view of an exemplary device in accordance with the present teachings.

FIG. 10 is a perspective view of a perspective view of a lower A-pillar reinforcing structure 1. The reinforcing structure 1 has a first end 6 and a second end 10 with a first edge 20 and a second edge 22. The reinforcing structure 1 has a generally triangular shape. The first end 8 being substantially wider than the second end 12. The first end wall 16 includes a rounded portion, extending proximally towards the second end 12. Walls 78, 79 extend angularly from the rounded portion of the first end wall 16 to the second edge 22, forming a center section 19 of the reinforcement structure 1. The center section 19 has a first ribbed section 84 and a second ribbed section 85. A bridge 87 is disposed between the first ribbed section 84 and the second ribbed section 85. The end of the bridge 87 facing the first edge 20 ends in a depression 14 with secondary material 4. The end of the bridge facing the second edge is adjacent to a first connector plate 90 disposed within the first surface 9 of the reinforcing structure. The first connector plate 90 is sunken below the first surface 9. At the second edge 22, the first end wall 16 has a rounded cutaway 64 with a second connector plate 91 disposed within. Immediately adjacent to the rounded cutaway 64 on the second edge 22 is a notch 37. From the notch 37 to the second end wall 18, the second edge 22 is straight. From the second end wall 18 moving towards the first end 6, the first edge 20 includes a first straight portion 13 and a second straight portion 15 connected by a curved transition 17. The curved transition 17 extends the first edge 20 out, such that the second straight section 15 extends further from the longitudinal axis 5 than the first straight section 13. Disposed along the first edge 20 in the second straight portion 15 is a reinforced cutaway 92 with an attachment tab 47.

Figure 11:
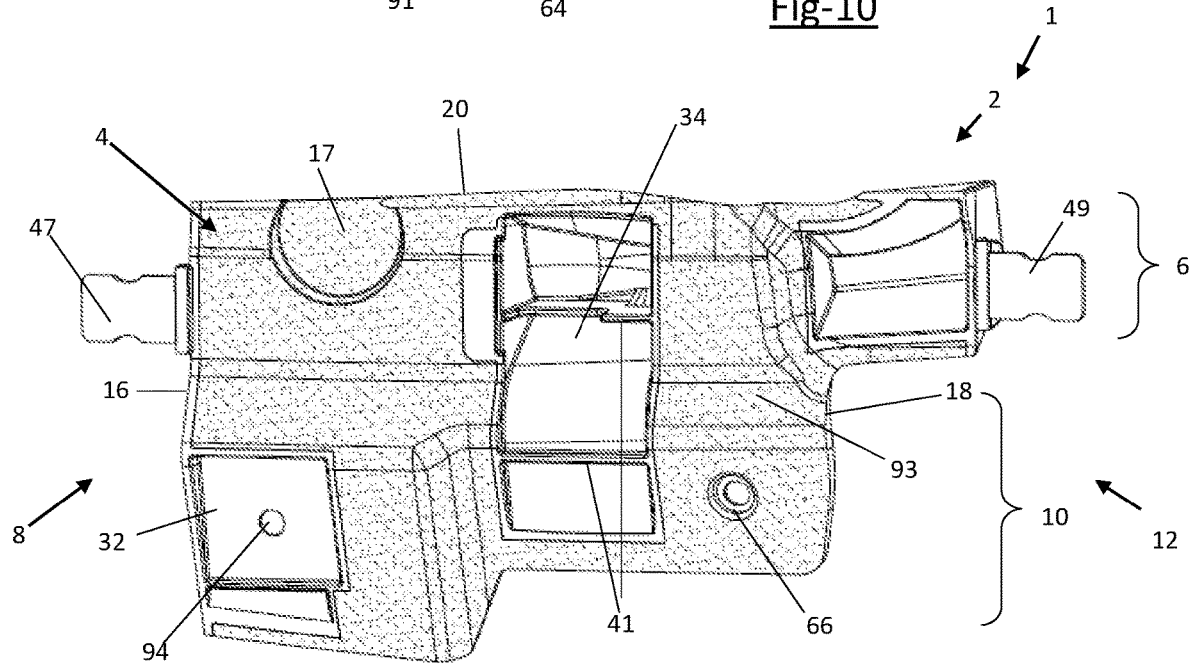
FIG. 11 illustrates a perspective view of an exemplary device in accordance with the present teachings.

FIG. 11 displays a perspective view of a mid B-pillar device 1 consistent with the teachings herewith. The device 1 includes a carrier 2 and a secondary material 4. The carrier 2 includes a first section 6 and a second section 10 connected together by a connector portion 93. The first end wall 16 extends across the first section 6, connector portion 93, and the second section 10. The first edge 20 extends from the first end wall 16 to the second end wall 18. Reinforcement 33 extends distally from the second end wall 18 On the first section 6, an attachment tab 47 is connected to the first end wall 16. A second attachment tab 49 is connected to reinforcement 33 on the second end 12. Proximal to the first end wall 16 is a depression 17 with a circular shape. At the midpoint 7 of the carrier, a reinforced cavity 34 spans from the first section 6 to the second section 10, across the connecting portion 93 of the carrier 2. The reinforced cavity 34 includes reinforcing ribs 41 longitudinally connecting one side of the cavity to the other. The reinforced cavity 34 is free of the secondary material 4. The first end 8 of the second section 10 aligns with the first section 6 along the first end wall 16. Connected to the first end wall 16 on the second section 12 is a reinforcement 32. Reinforcement 32 is sunken into the surface of the second section 12 with aperture 94 located in the center of reinforcement 32. The second end 12 of the second section 10 and the connecting portion 93 are proximal to the second end 12 of the first section 6. Located proximal to the second end 12 of the second section 10 and distal to the reinforcement cavity 34 is a raised passage 66.

FIG. 12 illustrates a perspective view of a mid C-pillar device 1. The device 1 includes a carrier 2 and secondary material 4. The carrier 2 has a first section 6 and a second section 10 with a first edge 20 and a second edge 22. The first section 6 is generally curved and the second section 10 is generally straight. The first end wall 16 includes an attachment tab 47. The second end wall 18 is disposed across the carrier and includes an attachment tab 49 connected thereto. The carrier has reinforcements 32, 33, 34 disposed within the first surface 9, each extending from the second edge 22 towards the first edge 20. The reinforcements 32, 33, 34 are divided by longitudinal walls 78. Reinforcement 33 is located approximately half way between the first end wall and the second end wall at a midpoint 7 of the carrier 2. Surrounding reinforcements 32, 33, 34 is the secondary material 4. A depression 14 with the shape of a partial circle extends from the first edge 20 towards the second edge 22. Two holes 70, 71 are located in the first surface 9. The second surface 11 of the carrier 2 includes a channel 61 that extends along the longitudinal axis 5.

FIG. 13 illustrates a perspective view of a device 1 for reinforcing a rocker panel. The device 1 includes a carrier 2 and a secondary material 4. The carrier 2 includes a first end 8 and a second end 12. Extending between the first end 8 and the second end 12 are a pair of longitudinal walls 78, 79 forming a center section 19. The center section 19 includes a plurality of reinforcing cells 50 disposed between longitudinal walls 78, 79. Between the plurality of reinforcement cells 50 are connectors 45. Secondary material 4 extends from walls 78, 79, over edges 20, 22 coating the first side 21 and a second side (not shown). Disposed in both the first edge 20 and the first side 21 of the carrier 2 are reinforcements 32, 33. Connecting to the first end wall 16 and the first edge 20 in the first side 21 is a recessed reinforcement 34. Transverse walls 31 extend into the first side 20.

FIG. 14 shows a perspective view of an upper A-pillar device 1. The device 1 has a generally curved profile. The device 1 is made up of a carrier 2 and a secondary material 4. The carrier 2 has a first end 8 and a second end 12, and a first edge 20 and a second edge 22. The first edge 20 and the second edge 22 are raised and extend between first end wall 16 and a second end wall 18. A longitudinal wall 78 extends between the first end wall 16 and the second end wall 18 with the same curvature as the carrier 2. The longitudinal wall 78 is located approximately half way between the first edge 20 and the second edge 22. Secondary material 4 is located between the first end wall 16, extending to the second end 12, between the longitudinal wall 78 and the second edge 22. A plurality of ribs 31 extend from the first edge 20 to the longitudinal wall 78. A plurality of holes 95 are disposed between the first edge 20 and the longitudinal wall 78 between some of the ribs 31. A center hole 96 is located approximately at the midpoint 7 of the carrier 2. Two angled supports 97 are connected the first edge 20 and ribs 31 around the center hole 96. The second end 12 of the carrier 2 has an attachment assembly 98 projecting away from the first surface 21. The attachment assembly 98 includes an interference-fit connector 93. The attachment assembly is located at the second end 12, connected to the first edge 20 to the second edge 22, and extends from the second end wall 18.

Figure 15:
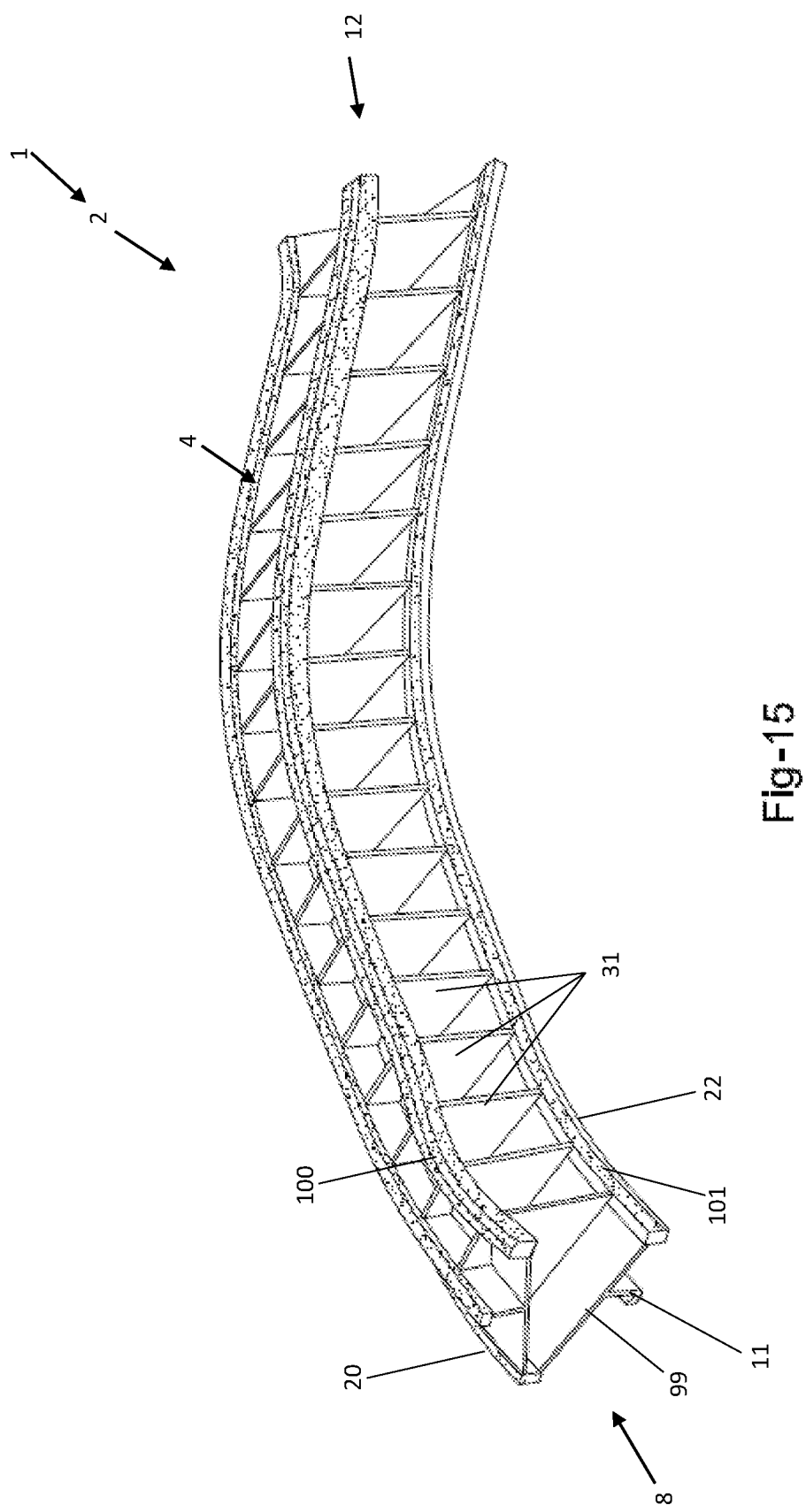
FIG. 15 illustrates a perspective view of an exemplary device in accordance with the present teachings.

FIG. 15 illustrates a perspective view of a first surface 9 of a composite frame structure 1. The composite frame structure 1 includes a carrier 2 and a secondary material 4. The carrier 2 has a curved profile between the first end 8 and the second end 12. An angular plate 99 extends angularly from a first edge 20 towards the second edge 22, away from the carrier 2. A plurality of reinforcing ribs 31 are located between the first end 8 and the second end 12. The ribs 31 extend through the angular plate 99 ending at rails 100, 101. The first edge 20 and the second edge 22 are coated in secondary material 4. The rails 100, 101 each are coated in secondary material 4. The second surface 11 has an attachment rail 138 that extends from the first end 8 to the second end 12.

Figure 16A:
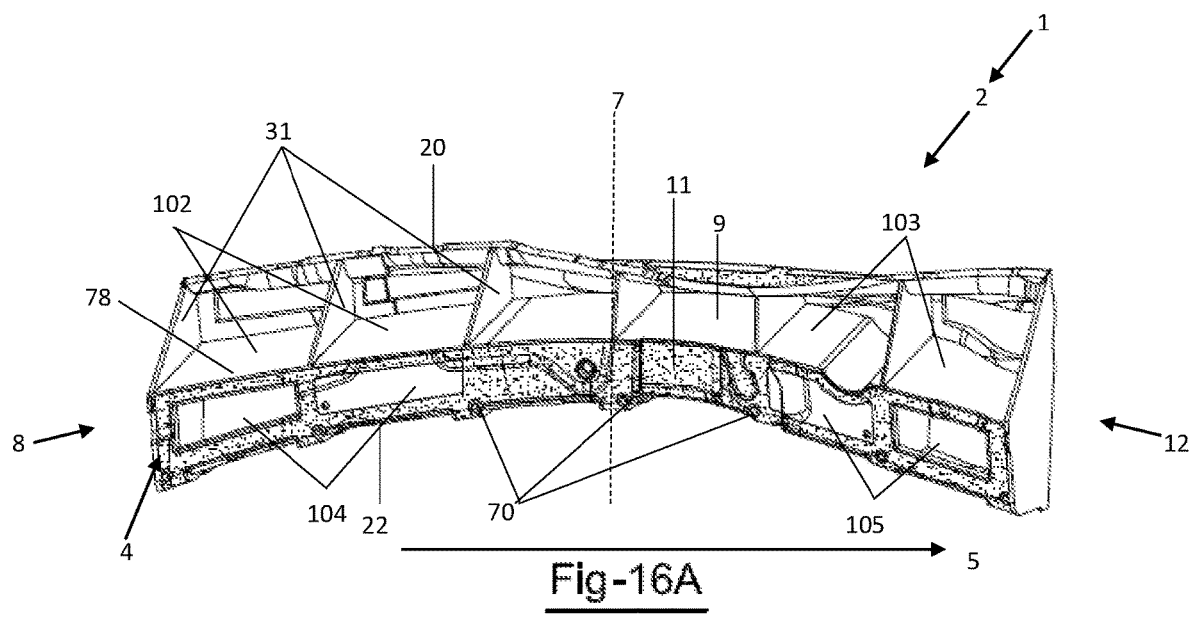
FIG. 16A illustrates a perspective view of an exemplary device in accordance with the present teachings.

FIG. 16A is a perspective view of a composite frame system 1. The composite frame system 1 includes a carrier 2 and a secondary material 4. The has a first end 8 and a second end 12 with a first edge 20 and a second edge 22. The carrier 2 tapers from the first end 8 and the second end 12 towards the midpoint 7 of the carrier 2. Running along the longitudinal axis 5 of the carrier 2 is wall 78. Wall 78 divides the carrier 2 between the first side 9 and the second side 11. The carrier 2 includes two material cutaways 102, 104 in the first end 8, and material cutaways 103, 105 in the second end 12. The material cutaways 102, 103 are located on the first side 11 between wall 78 and the first edge 20 and are free from secondary material 4. Material cutaways 104, 105 are located in the second side 12 of the carrier 2 between the second edge 22 and wall 78. The cutaways 103, 105 are outlined with secondary material 4. The second side 11 of the carrier 2 includes a plurality of mounting holes 70 adjacent to the second edge 22. The first side 11 of the carrier 2 has a plurality of reinforcing ribs 31 extending from the first edge 20 at an angle to wall 78. A rounded portion of wall 78 extends into the second side 11 from the first side 9. The second side 11 of the carrier 2 is substantially coated with secondary material 4 from wall 78 to the second edge 22.

Figure 16B:
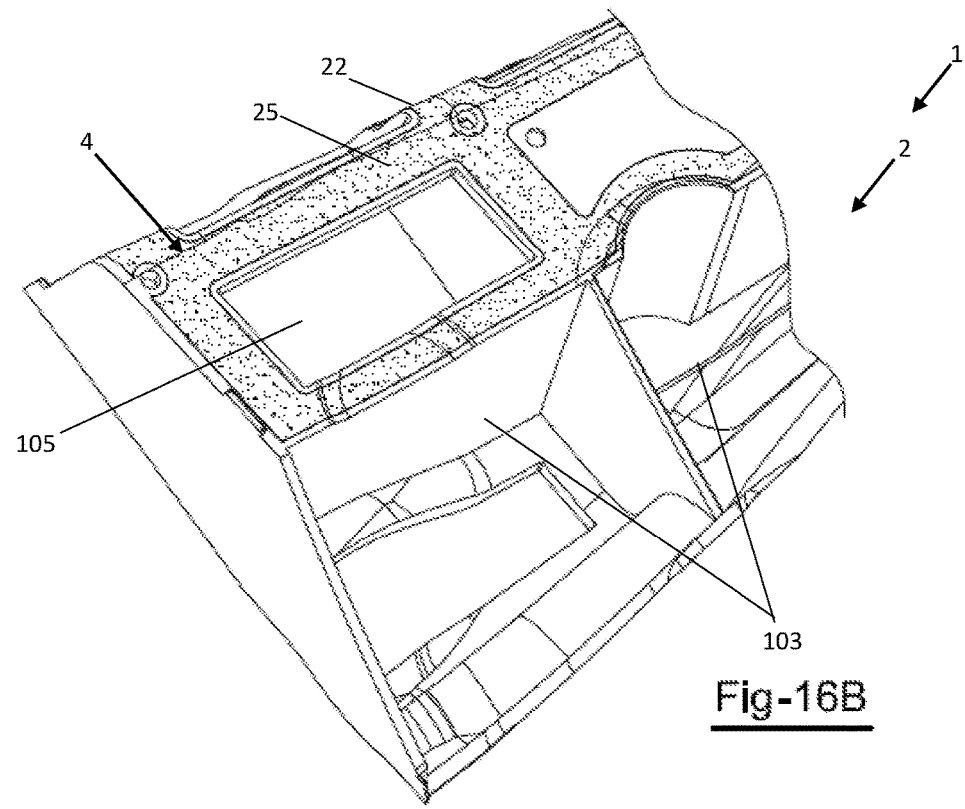
FIG. 16B illustrates a perspective view of an end portion of the device as shown at FIG. 16A.

FIG. 16B is a close up of the second end 12 of the composite frame system 1 shown in FIG. 16A. The secondary material 4 extends past the second edge 22 and onto the facing surface 25 of the second edge 22. The second side of the carrier is substantially coated with the secondary material 4, except for a perimeter around the cutaway 103.

Figure 17A:
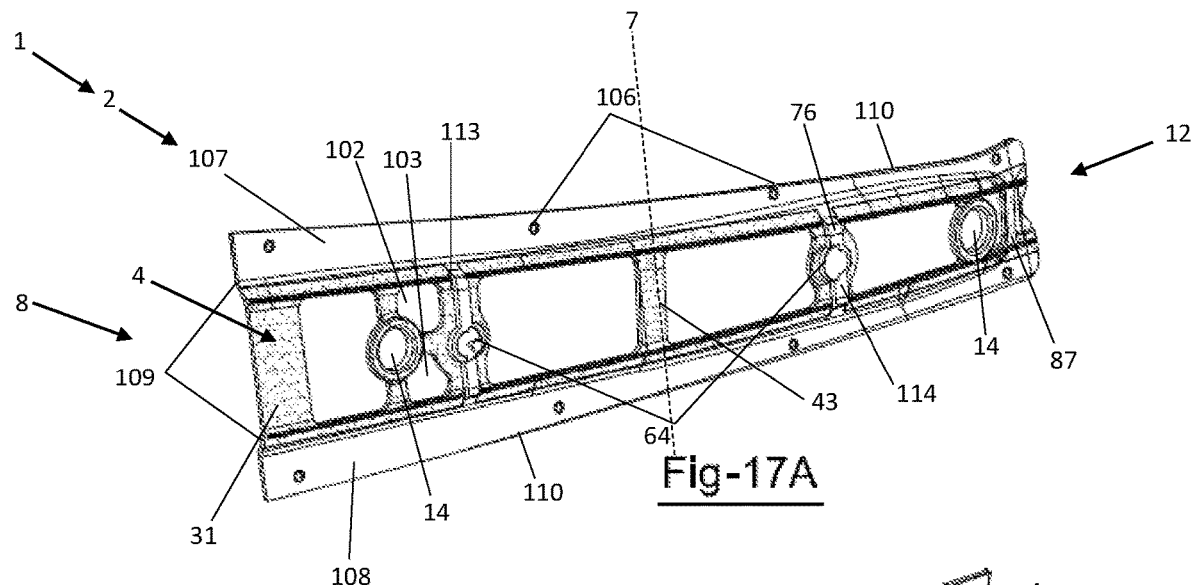
FIG. 17A illustrates a perspective view of a first surface of an exemplary device in accordance with the present teachings.

FIG. 17A illustrates perspective view of a first surface 9 of a reinforcing structure 1 for an upper b pillar consistent with the teachings herewith. The reinforcing structure 1 has a first end 8 and a second end 12. The reinforcing structure includes a first longitudinal body 107 and a second longitudinal body 108 extending between the first end 8 and the second end 12. The longitudinal bodies both include a plurality of standoff buttons 106. The first longitudinal body 107 and the second longitudinal body 108 each include an inner edge 109 and an outer edge 110. The longitudinal bodies 107, 108 taper from the first end 8 reducing in width towards the second end 12. The longitudinal bodies 107, 108 are connected by reinforcing ribs 31, 43 and bridges 87, 113, 114. Reinforcing rib 31 is located at the first end 8 and bridge 87 is located at the second end 12. Reinforcing rib 43 is located at the midpoint 7 of the carrier. A depression 14 is located at the proximal end of bridge 87 spanning between the inner edges 109 of the two longitudinal bodies 107, 108. Bridge 113 has two cutaways 102, 103, each touching the inner edge 109 of the longitudinal bodies 107, 108, respectively. At the distal end of bridge 113 is a depression 14. Bridge 114 is located between reinforcing rib 43 and bridge 87. Both bridges 113, 114 include a rounded projection 64 connected to a reinforcing wall 76 that extends across bridge 114 onto bodies 107, 108. Secondary material 4 coats the inner edge 109 of the longitudinal bodies 107, 108, the bridging structures and the ribs.

Figure 17B:
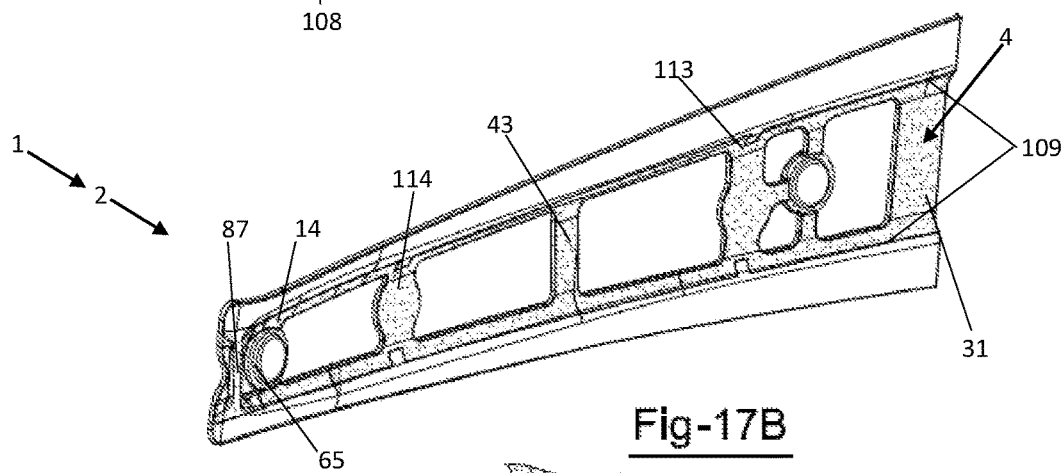
FIG. 17B illustrates a perspective view of a second opposing surface of the device shown in FIG. 17A.

FIG. 17B illustrates a perspective view of the second surface 11 of the device 1. Carrier 2 is coated with secondary material 4 on inner edges 109 and the reinforcing ribs 31, 43 and bridges 87, 113, 114. On the first surface 9, depressions 14 protrude towards the second surface 11, causing the projections 65.

Figure 17C:
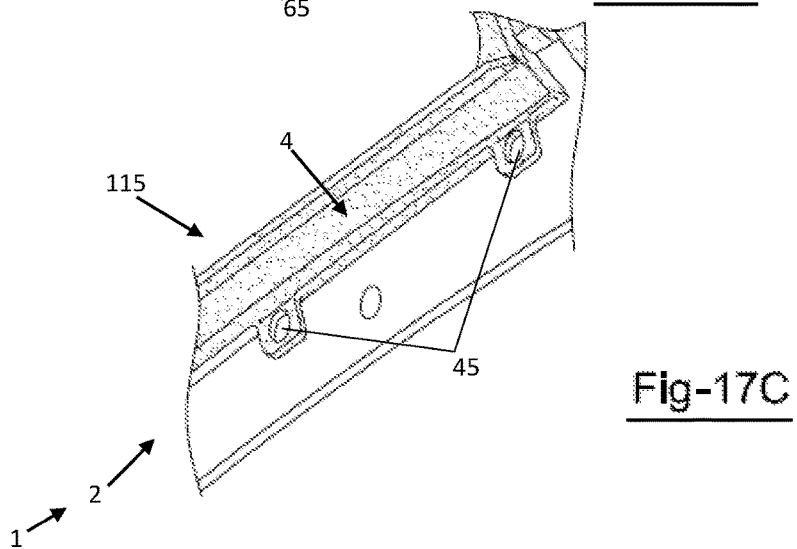
FIG. 17C shows a second device placed in contact with the device of FIG. 17A.

FIG. 17C shows a skeleton 115 placed in contact with the reinforcing structure 1 of FIG. 17A. The skeleton 115 has a shape substantially matching the reinforcing structure 2 between the inner edges 109 of the two longitudinal bodies 107, 108. The skeleton 115 includes connectors 45. The skeleton 115 is coated in secondary material 4.

Figure 18:
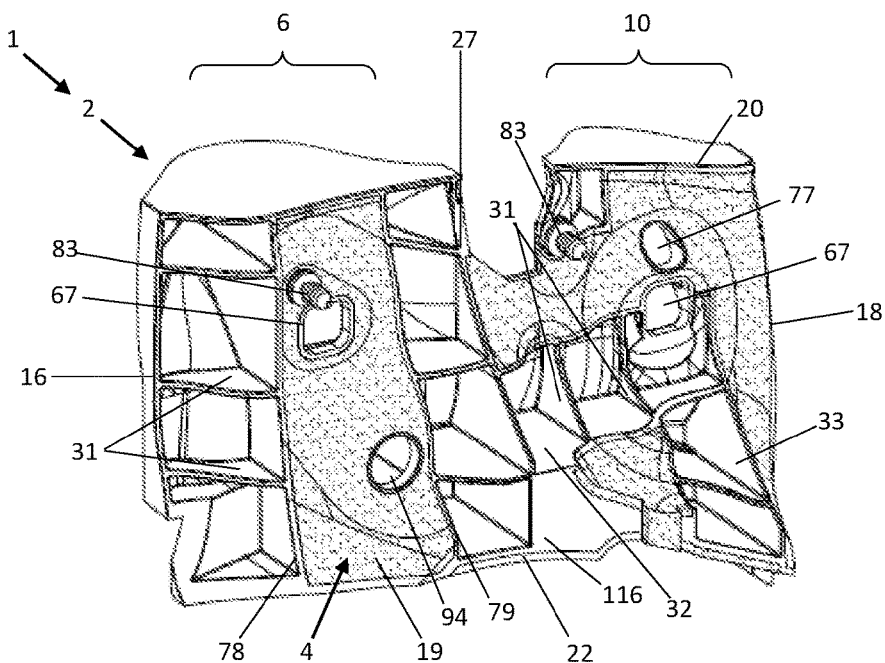
FIG. 18 illustrates a perspective view of an exemplary device in accordance with the present teachings.

FIG. 18 illustrates a perspective view of a wheelhouse reinforcing device 1. The device 1 includes a carrier 2 and a secondary material 4. The carrier has a first section 6 with a first end wall 16, and a second section 10 with a second end wall 18. The first section 6 includes reinforcing ribs 31 disposed on both sides of a center portion 19 of the first section 6. The reinforcing ribs 41 are connected to the center section 19 to a first wall 78 and a second wall 79 to the center section 19, respectively. The center section 19 is coated with the secondary material 4. Within the center section 19 are two apertures, one being a square aperture 67 and the other a round aperture 94. Immediately adjacent to the square aperture 67 is a connection barb 83. The first section 6 and the second section 10 of the carrier 2 share a common wall 116 and a second edge 22. The second section 10 of the carrier 2 is connected to the first section at dividing wall 27. Extending away from dividing wall 27 into the second section is a first reinforcement 32. The first reinforcement is divided by reinforcing ribs 31. A second reinforcement is located at the second end wall 18 and the common wall 116. The first reinforcement 32 is immediately adjacent to the second reinforcement 33, such that the first reinforcement 32 is perpendicular to the second reinforcement 33. Located between the first reinforcement 32 and the second reinforcement 33 is a square aperture 67. An oblong aperture 77 is located between the square aperture 67 in the second section 10 and the first edge 20. The second section 10 of the carrier 2 is coated in secondary material 4 around the first reinforcement 32 and the second reinforcement 33, and along the second end wall 18 extending towards dividing wall 27. The second section 10 includes a connection barb 83.

Figure 19:
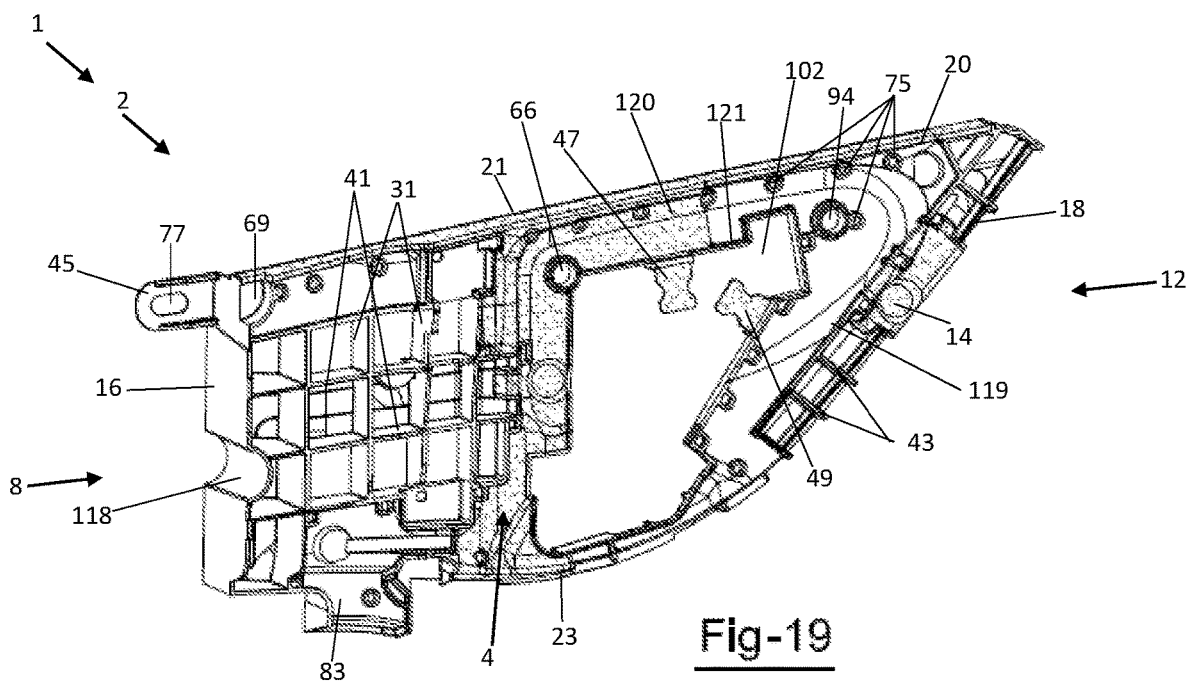
FIG. 19 illustrates a perspective view of an exemplary device in accordance with the present teachings.

FIG. 19 is a perspective view of a composite door reinforcement system 1. The device 1 includes a carrier 2 and a secondary material 4. The device 1 has a generally quadrilateral shape. The device 1 has a first end 8 and a second end 12 with a first side 21 and a second side 23. The first end 8 includes a first end 16 wall that extends from the first side 21 to the second side 23 and is generally straight. The first end wall 16 includes a concave portion 118 that projects into the carrier 2 proximally. The first end wall 16 further includes a connector 45 extending distally from the first end 8. The connector 45 has an oblong hole 77 to assist in mounting the device 1. On the proximal side of first end wall 16 from the connector 45, a rounded wall 69 connects the first edge 20 to the first end wall 16. The second end 12 of the carrier includes a second end wall 18 that extends between the first side 21 and the second side 23. The first side 21 of the carrier 2 extends distally further than the second side 23, so the second end wall 18 is angled to connect the two sides 21, 23. The first end 8 is made up of a series of reinforcing ribs 31, 41, intersecting each other to reinforce the structure between the first edge 20 and the second edge 22. The second end 22 of carrier 2 is generally straight and includes reinforced projection 83 extending away from the carrier. The second end 12 includes a plurality of reinforcing ribs 43 extending from the second end wall 18 proximally towards an inner wall 119. A portion of the second end 12 includes a depression 14 and is coated with the secondary material 4. Extending from the second side 23 towards the first end 8 is an interior attachment area 120. The interior attachment area 120 includes a material cutaway 102 surrounded by a reinforced perimeter 121. Two attachment tabs 47, 49 are connected to the reinforced perimeter 121 located in the cutaway 102. The attachment tabs 47, 49 are coated with secondary material 4. The first tab is perpendicular to the longitudinal axis 5 and the second tab is angled relative to the longitudinal axis 5. An aperture with a raised edge 66 connected to the corner of the cutaway 102 that is closest to the first edge 20 towards the first end 8. A second aperture 94 is located distal to the cutaway 102, towards the second end 12. The second aperture 94 includes a raised edge and is connected to a through hole 75. The carrier includes a plurality of through holes 75 adjacent to the first edge 20. The first edge 20 of the carrier 2 is coated with secondary material 4 from the first side 21 to the second side 23.

Figure 20:
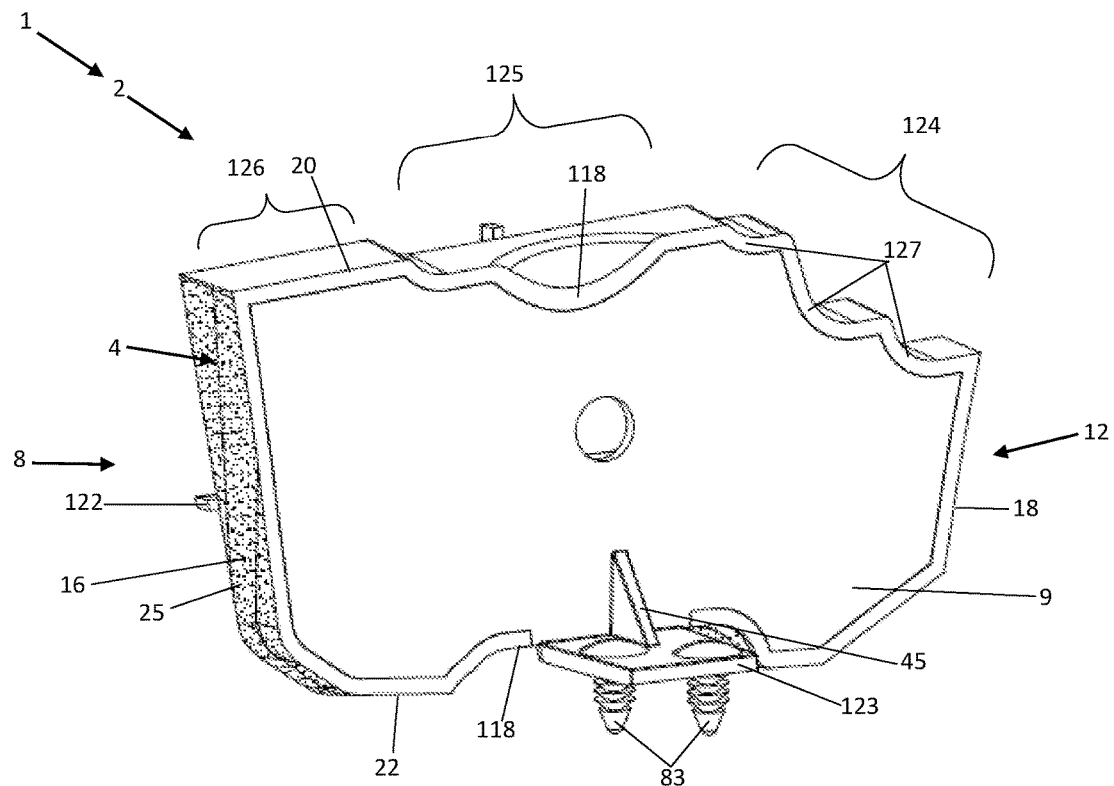
FIG. 20 illustrates a perspective view of an exemplary device in accordance with the present teachings.

FIG. 20 illustrates a perspective view of an upper c pillar device 1. The device 1 includes a carrier 2 and a secondary material 4. The carrier 2 has a first end 8 and a second end 12, as well as a first edge 20 and a second edge 22. The first end 8 stops at a first end wall 16. The first end 16 wall has a facing surface 25 that is coated with secondary material 4. The first end wall 16 extends between the first edge 20 and the second edge 22. The first end wall 16 curves proximally toward the second edge 22. The second edge 22 extends between the first end 8 and the second end 12. The second edge 22 includes a concave portion 118 such that the edge is moved proximally at the midpoint 7 of the carrier 2. Extending axially from the second edge 22 is a connection arm 123. The connection arm 123 includes a reinforced connector 45 that attaches to the first surface 9 of the carrier 2. Extending downward from the connection arm 123 are two connection barbs 83. At the second end 12 of the carrier 2, the second edge 22 angles upwards connecting to the second end wall 18. The second end wall 18 extends between the first edge 20 and the second edge 22. The first edge 20 is divided into three sections 124, 125, 126. The first section 124 of the first edge 20 moving proximally from the second end wall 18 is stepped, having three rounded portions 127 angled proximally from the second end wall 18 and away from the second edge 22. The second section 125 of the first edge 20 has a concave area 118, protruding into the carrier 2 towards the second edge 22. The second section 125 of the first edge 20 connects to both the first section 124 and the third section 126, transitioning downward to the first section 124 and transitioning upward to the third section 126. The third section 126 is generally planar. The carrier includes guides 122 projecting from the facing surface 25.

Figure 21:
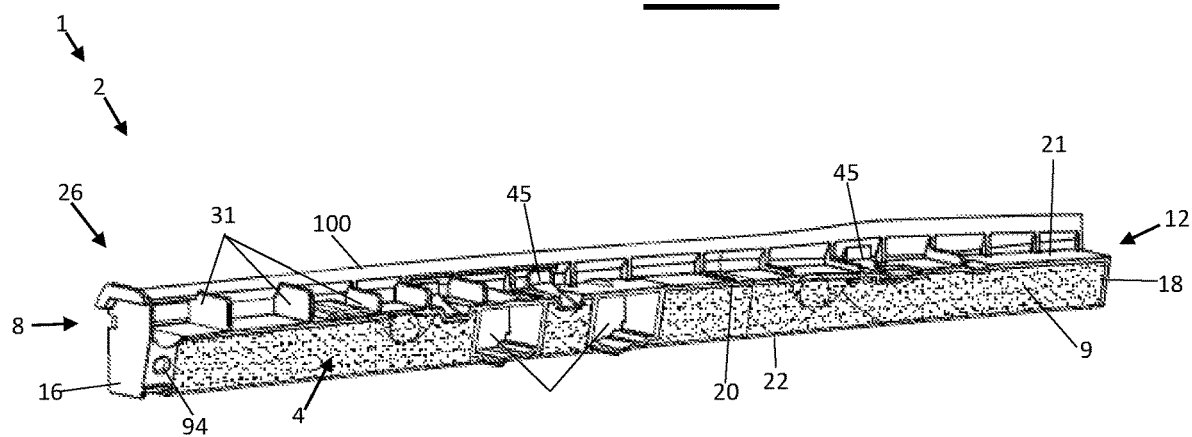
FIG. 21 illustrates a perspective view of an exemplary device in accordance with the present teachings.

FIG. 21 illustrates a perspective view of a device 1. The device 1 includes a carrier 2 and a secondary material 4. The carrier 2 has a first end 8 and a second end 12. The first end 8 includes a first end wall 16 and the second end 12 includes a second end wall 18. The body 26 of the carrier 2 extends between the first end wall 16 and the second end wall 18. The body 26 includes a first surface 21. From the first surface 21, a plurality of reinforcing ribs 31 extend outward connecting a rail 100 to the body 26. The rail 100 is attached to the first end wall 16. Connectors 45 extend from cutaways 102 in the body 26 further securing the rail 100 to the body 26. Reinforced passages extend between a first edge 20 and a second edge 22, from a first surface 9 of the carrier 2 to a second surface (not pictured). The passages at the second edge 22 are stepped, connecting the one side of the passages to another along the second edge 22. The bottom of the passages extend past the second edge 22 of the carrier 2. The first surface 9 is coated in secondary material 4. Adjacent to the first end wall 16 is an aperture 94 passing through the first surface 9 to the second surface 11.

FIG. 22A shows a perspective view of a first side 9 of a composite door system structure 1. The structure 1 includes a carrier 2 and a secondary material 4. The carrier 4 has a first section 6 and a second section 10. The first section 6 has a generally longitudinal profile and the second section 10 has a curved profile. The curved portion 17 extends between the first end 8 and the top edge 128 of the first section 6. The curved portion 17 includes notches 37 along its length. The first end 8 includes an attachment portion 46 with an attachment projection 83 and guides 122 surrounded by reinforcements 32. Below the attachment portion 46 is passage 95 The second section 10 has a material cutaway 102 located between the curved portion 17 and edge 129. Connecting to material cutaway 102 is aperture 94. Along the bottom edge 132 of the second section 10, semi-circular openings 68 project into the second section 10. The bottom edge 132 of second section 10 connects along top edge 128 of the first section 6. The first section 6 has a first end wall 16 and a second end wall 18. The second end wall 18 is rounded into bottom edge 130. Longitudinal wall 78 extends from second end wall 18 towards the first end wall 16. A transverse wall 76 intersects longitudinal wall 78 perpendicularly. Secondary material 4 is placed between longitudinal wall 78 and bottom edge 130, between first end wall 16 and the transverse wall 76.

FIG. 22B is a perspective view of the second side of the composite door system structure of FIG. 22A. The second section 10 is reinforced along the curved portion 17 with a plurality of reinforcing cells 50. An attachment projection 133 is located at the bottom edge 132 of the second section 10. Secondary material 4 is located throughout the first section 6 and the second section 10, disposed around the reinforcing structures 32, 50, passages 94, 95, and the cutaway 102. A channel is formed in the top edge 128 of the first section 6 to accommodate the attachment projection 133 on the second section 10. A material cutaway 103 is located in the top edge 128 of the first section 6. Reinforced cutaways 104, 105 extend from the longitudinal wall 78 downwards and between the first end wall 16 and the transverse wall. Reinforcing rib 31 divides the two cutaways 104, 105.

Figure 23:
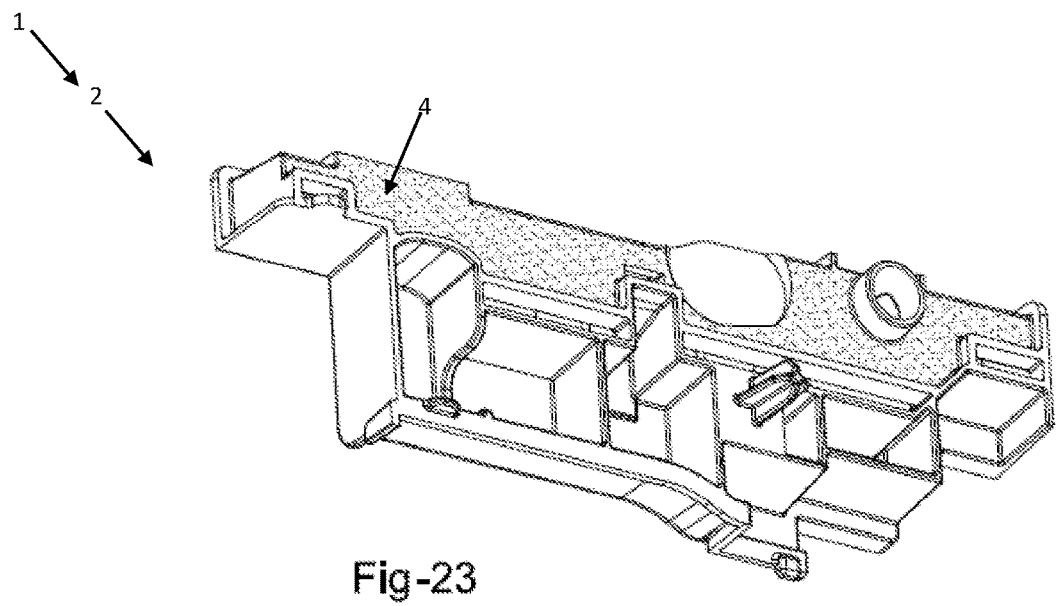
FIG. 23 illustrates a perspective view of an exemplary device in accordance with the present teachings.

FIG. 23 illustrates a device 1 for a roof system consistent with the teachings herewith. The device 1 includes a carrier 2 and a secondary material 4. The carrier 2 has a first end 8 and a second end 12 with a first edge 20 and a second edge 22 extending therebetween. The first edge 20 is coated in secondary material 4 and extends outward from the carrier 2 at approximately the midpoint 7. Located at the first edge 20 and the midpoint 7 is a depression 17. The depression 17 is free of the secondary material 4. A raised aperture is located between the depression 17 and the second end 12. Guides 122 extend from the first edge 20. The first end 8 has an L-shape. The first end wall 16 connects to a perpendicularly to a longitudinal wall 78. Reinforcement 32 connects to the first end wall 16 and the second edge 22. The longitudinal wall 78 is connected with reinforcement 33. The second end 12 has a second end wall 18 that is connected to the second edge 22 by a stepped wall 139 of reinforced cavities 140. Reinforced cavities 34, 144 are connected with the second edge 22 and are located between stepped cavities 140 and reinforcement 33. Immediately distal to reinforcement cavity 144 is attachment projection 83.

Figure 24:
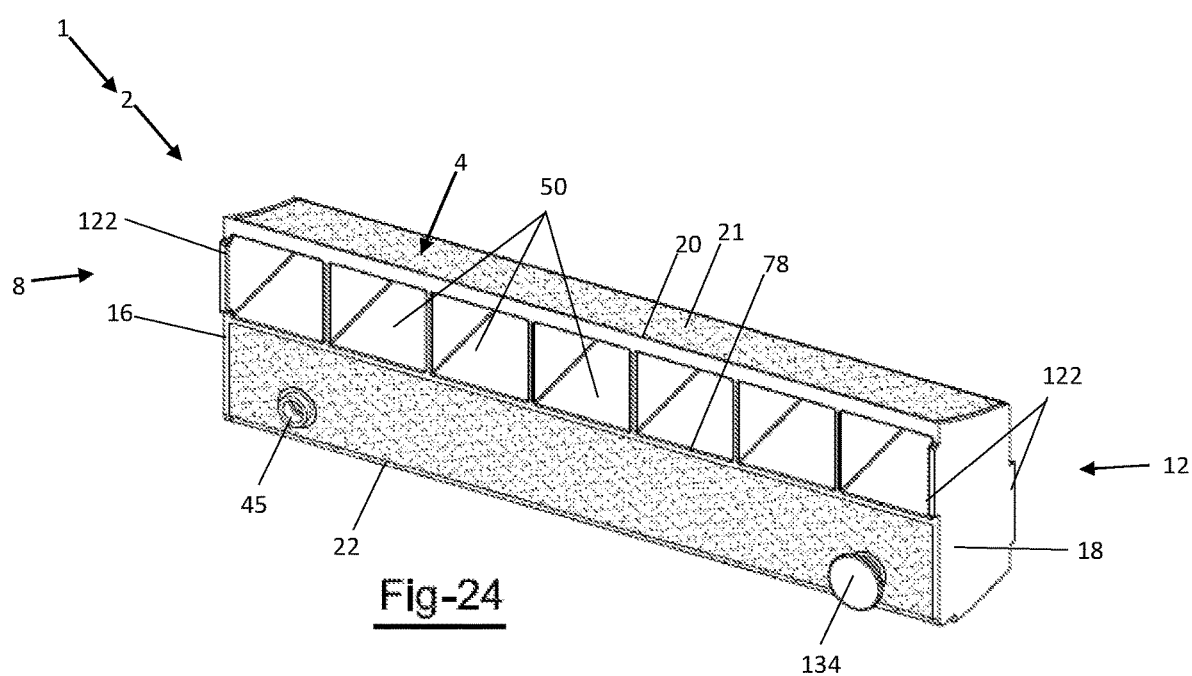
FIG. 24 illustrates a perspective view of an exemplary device in accordance with the present teachings.

FIG. 24 illustrates a device 1 for a frame system consistent with the teachings herewith. The device 1 includes a carrier 2 and a secondary material 4. The carrier 2 has a first end wall 16 and a second end wall 18 connected by a first edge 20 and a second edge 22. Guides 122 extend from the carrier 2 at the first end 8 and second end 12. A plurality of reinforcing cells 50 extend between the first end wall 16 and the second end wall 18, from the longitudinal wall 78 to the first edge 20. The first side 21 is connected to the first edge 20 and is coated with the secondary material 4. Secondary material 4 covers the carrier between the longitudinal wall 78 and the second edge 22. Connectors 45 are located on both ends of the carrier 2. A connector pin 134 is shown inserted into the connector 45 on the second end 12 of the carrier 2.

Figure 25A:
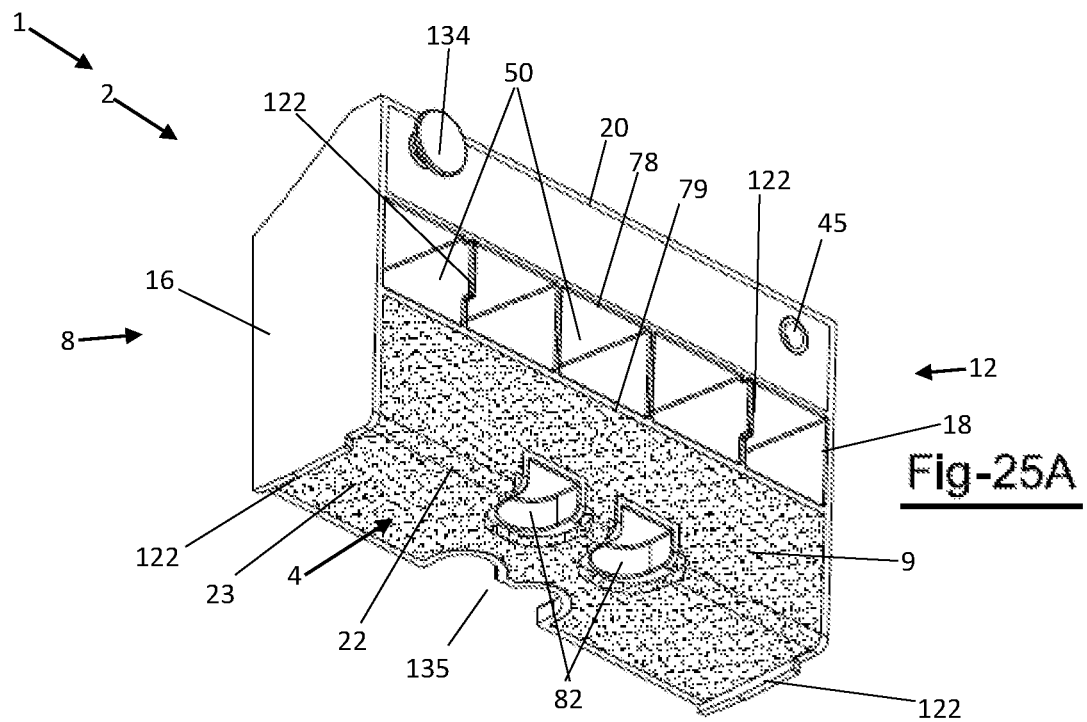
FIG. 25A illustrates a perspective view of an exemplary device in accordance with the present teachings.
Figure 25B:
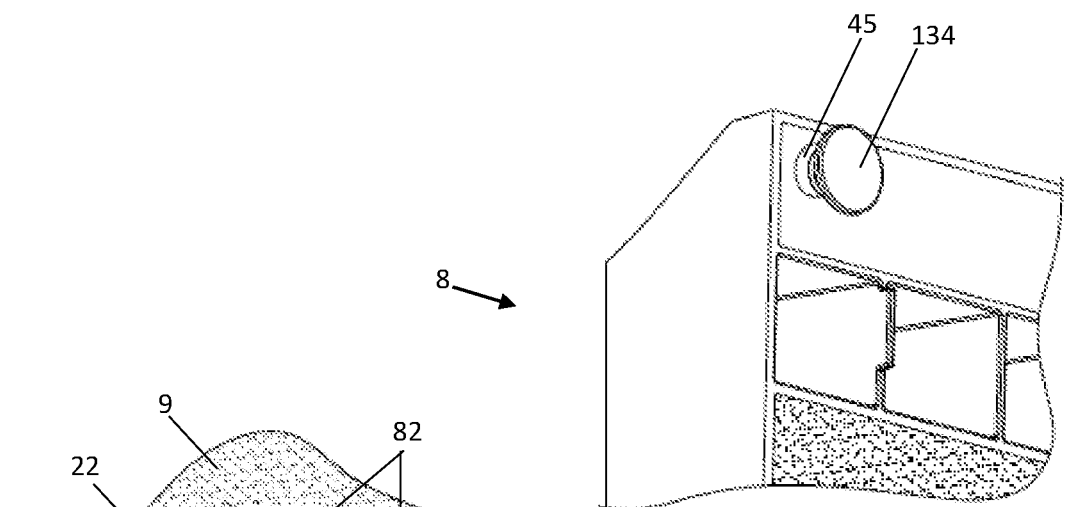
FIG. 25B illustrates a close-up view of a connector pin as shown on the device of FIG. 25A.
Figure 25C:
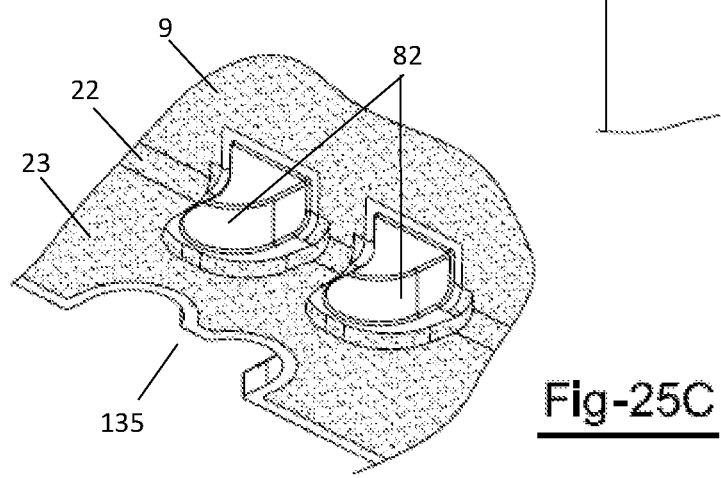
FIG. 25C illustrates a close-up view of a central portion of the device as shown in FIG. 25A.

FIGS. 25A-C illustrates a device 1 for a frame system consistent with the teachings herewith. FIG. 25A is a perspective view of the device 1. The device 1 includes a carrier 2 and a secondary material 4. The carrier has a first end 8 with a first end wall 16, and a second end 12 with a second end wall 18. Guides 122 extend from the end walls 16, 18. Disposed between the first end wall 16 and the second end wall 18 are a first edge 20 and a second edge 22. Longitudinal walls 78, 79 extend between the first end wall 16 and the second end wall 18. Between longitudinal walls 78, 79 are reinforcing cells 50. Guides 122 are located on the plurality of reinforcing cells 50. Connectors 45 are located on both ends 8, 12 between the first edge 20 and longitudinal wall 78. Connector pin 134 is shown inserted into the connector 45 on the first end 8. Secondary material 4 is located on the carrier 2 from longitudinal wall 79 to the second edge 22, and from the second edge 22 across the second side 23. Semi-circular reinforcements 82 are located in the second edge 22 extending into both the first surface 9 and the second side 23. A double humped cutaway 135 projects into the second side 23 and the second surface (not pictured). FIG. 25B illustrates a close-up view of the first end 8 showing the connector pin 134 inserted into the connector 45. FIG. 25C illustrates a close-up view of the semi-circular reinforcements 82 and the double humped cutaway 135. The semicircular reinforcements 82 and the double humped cutaway 135 are adapted to slide over weld nuts or the like when the device is located within a cavity.

Figure 26A:
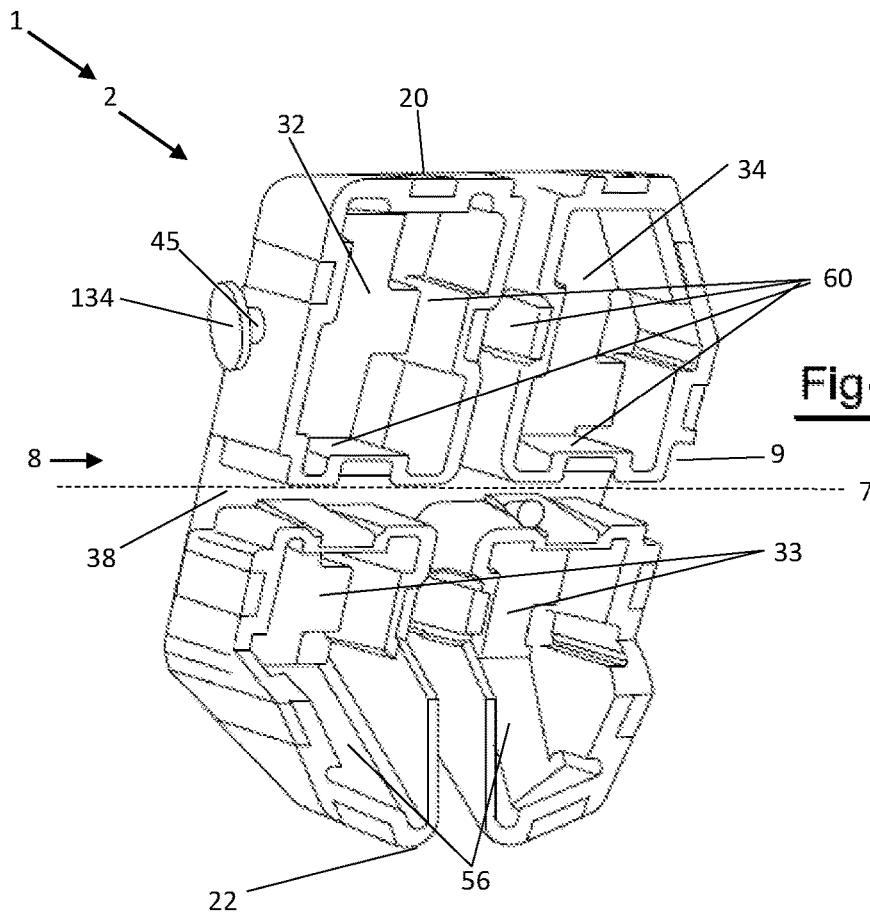
FIG. 26A illustrates a perspective view of an exemplary device in accordance with the present teachings.
Figure 26C:
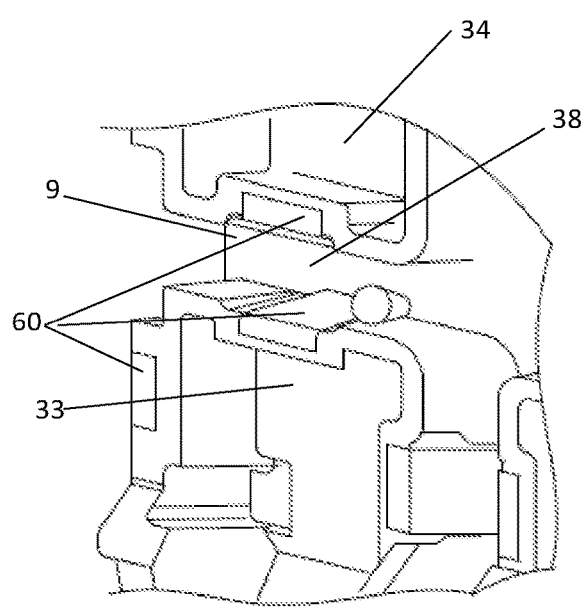
FIG. 26C illustrates a close-up view of top portion of the device as shown in FIG. 26A.
Figure 26B:
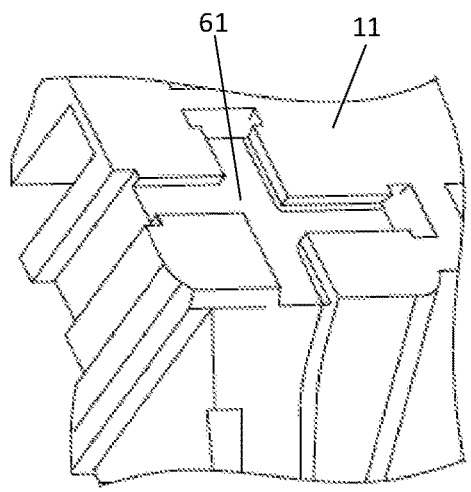
FIG. 26B illustrates a close-up view of a central portion of the device as shown in FIG. 26A.

FIGS. 26A-26C illustrates a perspective view of a device 1 for use in a frame system consistent with the teachings herewith. The device 1 includes a carrier 2 that is configured to accept secondary material (not shown). The carrier 2 has reinforcements 32, 33, 34. Reinforcements 32, 34 are located from the first edge 20 and the midpoint 7. Reinforcement 32 has a generally square shape and reinforcement 34 is generally polygonal. Reinforcements 33 are located from the midpoint 7 to the second edge 22. Reinforcements 33 have an elongated bottom wall 56 which protrudes angularly away from the first surface 9 of the carrier 2. Channels 38 are located on the inner portions of the reinforcements 32, 33, 34 to direct the flow of secondary material. Channels 60 are located on the outer portions of reinforcements 32, 33, 34. Along the first end 8, reinforcement 32 includes connector pin 134 inserted connector 45.

FIG. 26B illustrates a portion of the second surface 11 of the device 1, focusing on the channels 61. The channels 61 allow activatable material to flow into designated locations. The activatable material that flows through channels 60 on the first surface 9 passes through the carrier 2 to the second surface 11 following channels 61.

FIG. 26C illustrates a close up of reinforcements 33, 34 and channels 38, 60 on the first surface 9.

Figure 27:
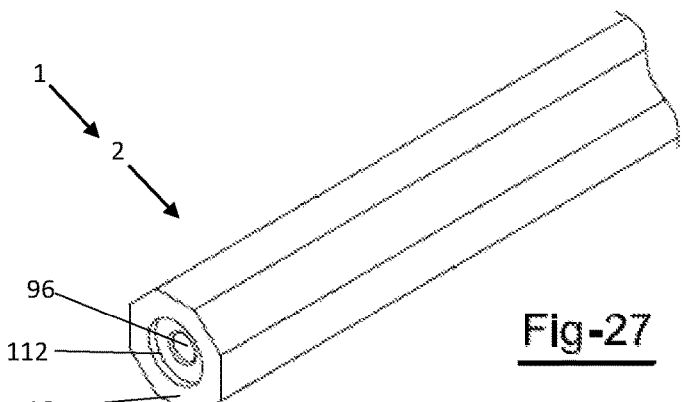
FIG. 27 illustrates a perspective view of an exemplary device in accordance with the present teachings.

FIG. 27 illustrates a device 1 for use in with the steering system consistent with the teachings herewith. The device 1 includes a carrier 2 and secondary material (not pictured). The carrier 2 has an octagonal shape. The first end wall 16 of the carrier 2 is shown with a recessed plate 112 with a center passage 96.

Figure 28:
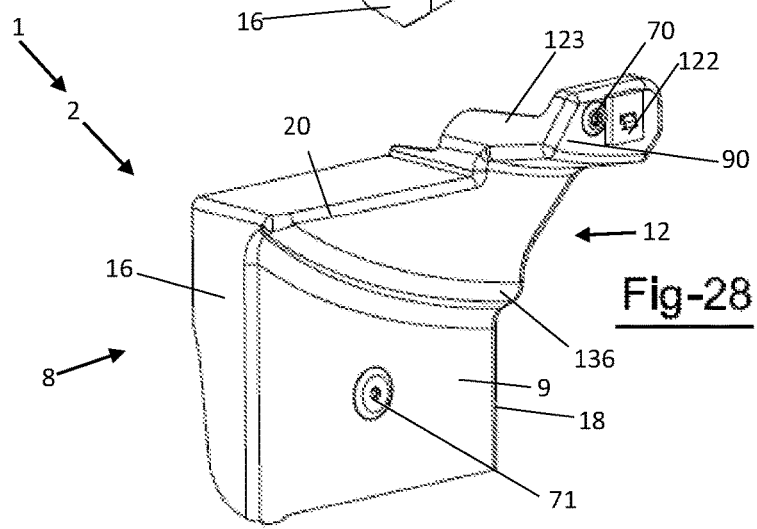
FIG. 28 illustrates a perspective view of an exemplary device in accordance with the present teachings.

FIG. 28 illustrates a device 1 for use in a door reinforcing system consistent with the teachings herewith. The device 1 includes a carrier 2 and a secondary material (not shown). The carrier has a first end 8 and a second end 12. The second end 12 has an arm 123 extending axially from the carrier 2. The arm 123 has a connector plate 90 with a mounting hole 70 and a guide 122. The first side 21 of the carrier 2 includes a projecting portion 136 which extends axially from the first surface 9. The projecting portion of the first surface 9 is curved, starting at the first end wall 16 and ending at the second end wall 18. The projecting portion 136 curves into the carrier 2 from the first end wall 16 and the first edge 20. The first end wall 16 and the second end wall 18 both axially extend with the projecting portion 136. Disposed in the carrier 2 is a second mounting hole 71. The second mounting hole 71 is raised above the first surface 9.

Figure 29:
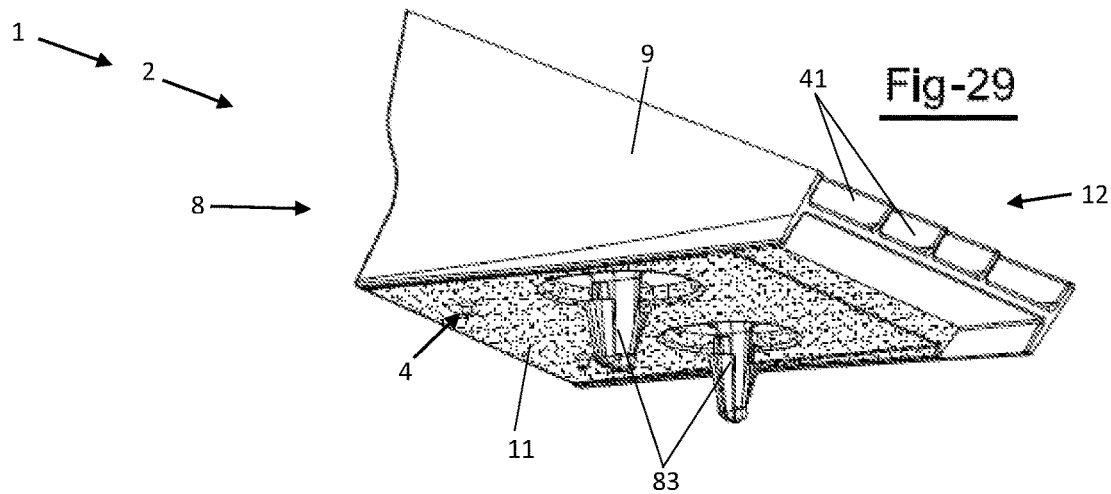
FIG. 29 illustrates a perspective view of an exemplary device in accordance with the present teachings.

FIG. 29 illustrates a device 1 for use in a cowl system consistent with the teachings herewith. The device 1 includes a carrier 2 and secondary material 4. The carrier 2 has a generally wedge shape with a first end 8 and a second end 12 and a first side 21 and a second side 23. The first side 21 includes ribs 41 along the first section 6. The second side 23 is coated with the secondary material 4. Projecting from the second side 23 are attachment projections 83. The area immediately surrounding the attachment projections 83 is free of the secondary material 4.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, from 20 to 80, or even from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the teachings of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates examples that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

I claim:

1. A device for reinforcing a cavity including:
   a) a carrier with a length extending between a first end and a second end including:
      one or more longitudinal structures; and
      one or more transverse structures located at one or more of the first and second ends of the carrier, said structures forming at least one carrier cavity; and
      a first portion and a second portion located within the at least one carrier cavity and the first portion having a first cross section thickness that is less than 50% of a second cross sectional thickness of the second portion; and
   b) a secondary material comprising a two-part room temperature cure phosphate ester-based foam and a tackifying agent located onto at least the one or more longitudinal structures;
   wherein the device is configured to attach to the cavity with one or more mechanical fasteners, an adhesive, or both.

2. The device of claim 1, wherein the carrier includes one or more rib structures.

3. The device of claim 1, wherein the carrier includes one or more reinforcement cavities.

4. The device of claim 1, wherein the one or more mechanical fasteners are located on the carrier.

5. The device of claim 1, wherein the carrier has one or more attachment portions for accepting the one or more mechanical fasteners.

6. The device of claim 1, wherein the device is configured to be slid into the cavity, wherein the one or more fasteners are placed through walls of the cavity from an outside into the device.

7. The device of claim 1, wherein the one or more transverse structures are free from secondary material.

8. The device of claim 1, wherein the one or more transverse structures are coated with the secondary material.

9. The device of claim 2, wherein the one or more longitudinal structures, the one or more transverse structures, or both are positioned to form one or more channels on the carrier.

10. The device of claim 9, wherein secondary material is guided by the one or more channels to a desired location on the device.

11. The device of claim 1, wherein the carrier has a longitudinal profile.

12. The device of claim 1, wherein the carrier has a curved profile.

13. The device of claim 9, wherein the carrier includes one or more guides for locating the device into the cavity.

14. The device of claim 1, wherein the carrier includes one or more longitudinal walls, one or more transverse walls, or both.

15. The device of claim 1, wherein the one or more longitudinal walls are connected with one or more transverse ribs.

16. The device of claim 1, wherein the carrier includes one or more holes.

17. The device of claim 16, wherein the carrier includes one or more depressions located in a surface of the carrier.

18. The device of claim 17, wherein the one or more depressions are filled with the secondary material.

19. The device of claim 1, wherein blowing agents are omitted from the secondary material.

20. The device of claim 19, wherein the secondary material is a blend of two or more secondary materials.

\* \* \* \* \*